(12) United States Patent
Koyama et al.

(10) Patent No.: US 11,421,120 B2
(45) Date of Patent: Aug. 23, 2022

(54) INK COMPOSITION, METHOD FOR PRODUCING THE SAME, AND IMAGE-FORMING METHOD

(71) Applicant: FUJIFILM CORPORATION, Tokyo (JP)

(72) Inventors: Ichiro Koyama, Kanagawa (JP); Shota Suzuki, Kanagawa (JP); Noriaki Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/795,593

(22) Filed: Feb. 20, 2020

(65) Prior Publication Data

US 2020/0190344 A1    Jun. 18, 2020

Related U.S. Application Data

(63) Continuation of application No. PCT/JP2018/030379, filed on Aug. 15, 2018.

(30) Foreign Application Priority Data

Aug. 29, 2017  (JP) .............................. JP2017-164674

(51) Int. Cl.
| | | |
|---|---|---|
| *C09D 11/101* | (2014.01) | |
| *B41M 5/00* | (2006.01) | |
| *C09D 11/30* | (2014.01) | |
| *B41J 2/21* | (2006.01) | |
| *B41J 2/01* | (2006.01) | |
| *C09D 11/322* | (2014.01) | |
| *C09D 11/023* | (2014.01) | |

(52) U.S. Cl.
CPC ............... *C09D 11/101* (2013.01); *B41J 2/01* (2013.01); *B41J 2/2107* (2013.01); *B41M 5/0023* (2013.01); *C09D 11/30* (2013.01); *C09D 11/322* (2013.01); *C09D 11/023* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 9,403,357 B1 | 8/2016 | Robinson et al. | |
| 2004/0116596 A1* | 6/2004 | Vincent | C09D 11/30 524/775 |
| 2004/0176498 A1* | 9/2004 | Ando | C09D 11/16 523/160 |
| 2004/0176530 A1* | 9/2004 | Tielemans | C09D 11/32 524/589 |
| 2006/0289842 A1* | 12/2006 | Craig | C08K 3/08 252/514 |
| 2007/0166460 A1* | 7/2007 | Cai | H05K 3/4664 427/258 |
| 2009/0226682 A1* | 9/2009 | Yatake | B41M 5/0023 428/196 |
| 2009/0298962 A1 | 12/2009 | Studer et al. | |
| 2010/0140564 A1* | 6/2010 | Overbreek | C09D 11/101 252/514 |

(Continued)

FOREIGN PATENT DOCUMENTS

| | | |
|---|---|---|
| CN | 101522745 A | 9/2009 |
| CN | 101649036 A | 2/2010 |

(Continued)

OTHER PUBLICATIONS

Extended European Search Report dated Jul. 31, 2020, issued in corresponding EP Patent Application No. 18852261.9.

(Continued)

*Primary Examiner* — Manish S Shah
(74) *Attorney, Agent, or Firm* — Solaris Intellectual Property Group, PLLC

(57) ABSTRACT

An ink composition contains: water; and a particle including a photopolymerizable monomer and a polymer having a blocked isocyanate group having an unblocking temperature of 150° C. or less.

10 Claims, 1 Drawing Sheet

(56) References Cited

U.S. PATENT DOCUMENTS

| | | | |
|---|---|---|---|
| 2010/0249304 A1* | 9/2010 | Kitamura | C09J 11/00 |
| | | | 524/403 |
| 2010/0273929 A1* | 10/2010 | Kitagawa | D06P 1/44 |
| | | | 524/502 |
| 2012/0306976 A1* | 12/2012 | Kitagawa | C09D 11/326 |
| | | | 347/100 |
| 2014/0144684 A1* | 5/2014 | Saitou | H05K 1/095 |
| | | | 174/257 |
| 2015/0064417 A1* | 3/2015 | Choi | C09D 11/322 |
| | | | 428/195.1 |
| 2015/0322291 A1 | 11/2015 | Salviato et al. | |
| 2017/0009001 A1 | 1/2017 | Takenouchi et al. | |
| 2017/0037270 A1 | 2/2017 | Loccufier et al. | |
| 2019/0023920 A1 | 1/2019 | Koyama et al. | |

FOREIGN PATENT DOCUMENTS

| | | | |
|---|---|---|---|
| CN | 102876113 A | 1/2013 | |
| CN | 104204112 A | 12/2014 | |
| CN | 104231180 A | 12/2014 | |
| CN | 105008411 A | 10/2015 | |
| CN | 106029727 A | 10/2016 | |
| CN | 106459633 A | 2/2017 | |
| EP | 2832756 A1 | 2/2015 | |
| EP | 3081607 A1 | 10/2016 | |
| JP | H05-163452 A | 6/1993 | |
| JP | H08-218026 A | 8/1996 | |
| JP | 2003-064236 A | 3/2003 | |
| JP | 2003-268271 A | 9/2003 | |
| JP | 2003-313268 A | 11/2003 | |
| JP | 2004-269823 A | 9/2004 | |
| JP | 2016-503122 A | 2/2016 | |
| JP | 2016-138229 A | 8/2016 | |
| WO | 2017/135085 A1 | 8/2017 | |

OTHER PUBLICATIONS

International Search Report issued in International Application No. PCT/JP2018/030379 dated Oct. 2, 2018.

Written Opinion of the ISA issued in International Application No. PCT/JP2018/030379 dated Oct. 2, 2018.

English language translation of the following: Office action dated Sep. 22, 2021 from the SIPO in a Chinese patent application No. 201880055359.5 corresponding to the instant patent application. This office action translation is submitted now in order to supplement the understanding of the cited references which are being disclosed in the instant Information Disclosure Statement.

English language translation of the following: Office action dated Mar. 18, 2022 from the SIPO in a Chinese patent application No. 201880055359.5 corresponding to the instant patent application. This office action translation is submitted now in order to supplement the understanding of the cited references which are being disclosed in the instant Information Disclosure Statement.

* cited by examiner

INK COMPOSITION, METHOD FOR PRODUCING THE SAME, AND IMAGE-FORMING METHOD

CROSS-REFERENCE TO RELATED APPLICATIONS

This application is a continuation application of International Application No. PCT/JP2018/030379, filed Aug. 15, 2018, the disclosure of which is incorporated herein by reference in its entirety. Further, this application claims priority from Japanese Patent Application No. 2017-164674, filed Aug. 29, 2017, the disclosure of which is incorporated herein by reference in its entirety.

BACKGROUND OF THE INVENTION

1. Field of the Invention

The present disclosure relates to an ink composition, a method for producing the ink composition, and an image-forming method.

2. Description of the Related Art

In the field of ink compositions, there are known techniques using blocked isocyanates.

For example, JP2004-269823A discloses, as a colored-fine-particle dispersion having high production stability, high dispersion stability, and improved solvent resistance, and being suitable for ink jet inks, a colored-fine-particle dispersion prepared by mixing a coloring material and a resin and performing dispersion in water, wherein the colored fine particles have a crosslinked structure, and the crosslinked structure is formed by a reaction of a blocked isocyanate. This JP2004-269823A discloses an ink jet ink that is an aqueous ink including the colored-fine-particle dispersion.

In addition, JP2016-138229A discloses, as a thermosetting ink-jet-printing ink for printing on non-absorptive media, an ink-jet-printing ink including a thermosetting resin, a pigment, a dispersing agent, and a solvent, wherein the thermosetting resin includes an acrylic resin having a hydroxyl group, and a low-temperature-unblockable blocked isocyanate, and the solvent includes a glycol ether-based solvent as a main component, and at least one selected from alcohol-based solvents, acetate-based solvents, and aromatic solvents.

In addition, JP2003-268271A discloses, as an ink-jet-textile-printing pigment ink having high printing stability, high ejection stability, high preservation stability, and high color fastness to washing and laundering, an ink-jet-textile-printing pigment ink at least including a pigment covered with a resin, a water-soluble organic solvent, a blocked isocyanate, and water.

SUMMARY OF THE INVENTION

In general, in an image formed from an ink containing water as a liquid component, the liquid component is less likely to be removed from the image, compared with an image formed from an ink containing, as a liquid component, a polymerizable monomer and/or an organic solvent. For this reason, such an image formed from an ink containing water as a liquid component has low scratch resistance in some cases.

Accordingly, in some cases, there has been a demand for an improvement in the scratch resistance of an image formed from an ink containing water as a liquid component.

An object of the present disclosure is to provide an ink composition capable of forming an image having high scratch resistance, a method for producing the ink composition, and an image-forming method using this ink composition.

Specific means for achieving the object includes the following embodiments.

<1> An ink composition, including:
water; and
particles including a polymerizable monomer and a polymer having a blocked isocyanate group having an unblocking temperature of 150° C. or less.

<2> The ink composition according to <1>, wherein the unblocking temperature of the blocked isocyanate group having an unblocking temperature of 150° C. or less is 120° C. or less.

<3> The ink composition according to <1> or <2>, wherein the blocked isocyanate group having an unblocking temperature of 150° C. or less is a reaction product of a blocking agent and an isocyanate group, and
the blocking agent is at least one selected from the group consisting of 2-methylimidazole, 2-ethylimidazole, 2-mercaptopyridine, 2-hydroxypyridine, 2,2,6,6-tetramethylpiperidine, 4-methylimidazole, imidazole, diethylmalonic acid, 2-methylimidazoline, benzimidazole, 1,1,3,3-tetramethylguanidine, t-butylethylamine, t-butylbenzylamine, 3,5-dimethylpyrazole, diisopropylamine, dicyclohexylamine, 2,6-dimethylpiperidine, methyl ethyl ketoxime, ε-caprolactam, 2-hydroxymethylpyridine, and N-isopropylcyclohexylamine.

<4> The ink composition according to <3>, wherein the blocking agent is at least one selected from the group consisting of 2-methylimidazole, 2-ethylimidazole, 2-mercaptopyridine, 2-hydroxypyridine, and 2,2,6,6-tetramethylpiperidine.

<5> The ink composition according to any one of <1> to <4>, wherein the polymer is a chain polymer, and the blocked isocyanate group having an unblocking temperature of 150° C. or less is disposed at an end of a main chain of the chain polymer.

<6> The ink composition according to any one of <1> to <5>, wherein the polymer includes at least one selected from the group consisting of a urethane polymer, a urea polymer, and a (meth)acrylic polymer.

<7> The ink composition according to any one of <1> to <6>, further including a compound having three or more active hydrogen groups.

<8> The ink composition according to <7>, wherein a content of the compound having three or more active hydrogen groups relative to a total solid-content amount of the particles is 2.0 mass % to 30 mass %.

<9> The ink composition according to any one of <1> to <8>, wherein the polymerizable monomer is a photopolymerizable monomer.

<10> The ink composition according to any one of <1> to <9>, being used as an ink jet ink.

<11> A method for producing the ink composition according to any one of <1> to <10>, the method including:
mixing and emulsifying an oil-phase component including an organic solvent, the polymer, and the polymerizable monomer, and an aqueous-phase component including water to form the particle.

<12> An image-forming method, including:
applying, onto a substrate, the ink composition according to any one of <1> to <10> to form an ink film; and
a step of heating the ink film.
<13> The image-forming method according to <12>, wherein the substrate has an active hydrogen group.

The present disclosure provides an ink composition capable of forming an image having high scratch resistance, a method for producing the ink composition, and an image-forming method using this ink composition.

BRIEF DESCRIPTION OF THE DRAWING

FIG. 1 illustrates a character image used for evaluation of the definition of images in EXAMPLES.

DESCRIPTION OF THE PREFERRED EMBODIMENTS

In this Specification, ranges defined by a value "to" a value include these values as the minimum value and the maximum value.

In this Specification, the amount of each of components in a composition means, when the composition contains a plurality of substances belonging to such a component, the total amount of the plurality of substances in the composition unless otherwise specified.

In this Specification, among ranges described in series, the upper limit value or the lower limit value of a range may be replaced by the upper limit value or the lower limit value of one of other ranges described in series, or may be replaced by a value described in Examples.

In this Specification, the term "step" includes not only an independent step, but also a step that is not clearly distinguished from another step but that achieves the intended result of the step.

In this Specification, "*" in chemical formulas denote bonding positions.

In this Specification, "images" mean any ink films formed from ink. The concept of "images" encompasses, in addition to patterned images (such as characters, symbols, and figures), solid images.

In this Specification, "light" is a concept that encompasses actinic energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

In this Specification, the ether group, the polyoxyalkylene group, the ester group, the amide group, the urea group, and the urethane group respectively mean an ether bond, a polyoxyalkylene bond, an ester bond, an amide bond, a urea bond, and a urethane bond.

Ink Composition

An ink composition according to the present disclosure (hereafter, also simply referred to as "ink") contains water, and particles including a polymerizable monomer and a polymer having a blocked isocyanate group having an unblocking temperature of 150° C. or less (hereafter, also referred to as "specified particles").

As described above, in general, in an image formed from an ink containing water as a liquid component, the liquid component is less likely to be removed from the image, compared with an image formed from an ink containing, as a liquid component, a polymerizable monomer and/or an organic solvent. For this reason, the image formed from such an ink containing water as a liquid component has low scratch resistance in some cases.

Regarding the above-described point, the ink according to the present disclosure enables formation of an image having high scratch resistance.

The reason why such advantages are provided is inferred as follows; however, the following reason does not limit the ink according to the present disclosure.

When the ink according to the present disclosure is applied onto a substrate to form an ink film, the ink film formed contains a component in the ink that is the specified particles including the polymerizable monomer and the polymer having a blocked isocyanate group having an unblocking temperature of 150° C. or less. The blocked isocyanate group is a reaction product of an isocyanate group and a blocking agent.

Heating of the ink film inferentially causes unblocking of blocked isocyanate groups in the specified particles into isocyanate groups. Two unblocked isocyanate groups inferentially react using residual water in the ink film, to form a urea bond. As a result, in the ink film, specified particles bond together via urea bonds, which inferentially causes thickening of the ink film.

The thickened ink film is cured by the effect of the polymerizable monomer, which inferentially results in formation of an image having high scratch resistance.

In contrast to the ink according to the present disclosure, in the ink described in JP2004-269823A, a blocked isocyanate is used as a starting material, and the blocked isocyanate is caused to react, to form the crosslinked structure of the colored fine particles. In other words, inferentially, the formed crosslinked structure of the colored fine particles no longer has the blocked isocyanate. For this reason, the ink described in JP2004-269823A inferentially does not provide the effect of improvement in the scratch resistance of images, which is provided by the ink according to the present disclosure.

In addition, the ink described in JP2016-138229A is not an ink containing water as a liquid component, but an ink containing an organic solvent as a liquid component. Thus, in JP2016-138229A, the object of improvement in the scratch resistance of images, which is an object unique to inks containing water as liquid components, is not expected.

In addition, the ink described in JP2003-268271A is an ink-jet-textile-printing pigment ink for improvements in printing stability, ejection stability, preservation stability, and color fastness to washing and laundering. Thus, in JP2003-268271A, the object of scratch resistance of images is inferentially not expected. In addition, in the ink described in JP2003-268271A, the specified particles are not expected to include a polymerizable monomer, and the ink is not limited as including the specified particles (specifically, particles including a polymer having a blocked isocyanate group having an unblocking temperature of 150° C. or less). Thus, the effect of improvement in the scratch resistance of images, which is provided by the ink according to the present disclosure, is inferentially not provided.

In general, an image formed from an ink containing water as a liquid component tends to have a low definition, compared with an image formed from an ink containing, as a liquid component, a polymerizable monomer and/or an organic solvent. The reason for this is inferred as follows: in an image formed from an ink containing water as a liquid component, the liquid component is less likely to be removed from the image, so that unintentional coalescence of ink droplets occurs on the substrate in some cases.

Regarding this point, the ink according to the present disclosure enables formation of high-definition images.

The reason why such advantages are provided is inferred as follows: the above-described thickening of the ink film suppresses unintentional coalescence of ink droplets on the substrate.

Incidentally, the ink droplets are an example of the ink film.

Hereinafter, components that can be included in the ink according to the present disclosure will be described.

Specified Particles

The specified particles include at least one polymer having a blocked isocyanate group having an unblocking temperature of 150° C. or less (hereafter, also referred to as "specified polymer").

Specified Polymer

Blocked Isocyanate Group Having Unblocking Temperature of 150° C. or Less

The specified polymer has a blocked isocyanate group having an unblocking temperature of 150° C. or less.

The specified polymer may have, as the blocked isocyanate group having an unblocking temperature of 150° C. or less, one species alone, or two or more species.

In this Specification, the unblocking temperature of the blocked isocyanate group means the minimum value of temperatures required to unblock the blocked isocyanate group into an isocyanate group.

The unblocking temperature of the blocked isocyanate group is measured in the following manner.

A liquid including a polymer having a blocked isocyanate group (a solution or a dispersion) is applied to silicon wafers. While the resultant coating films are heated at various temperatures, the coating films are subjected to infrared absorption spectrum (IR) measurement. On the basis of the results of IR measurement, the minimum value of temperatures required to unblock the blocked isocyanate group into an isocyanate group is determined. The determined minimum value is defined as the unblocking temperature of the blocked isocyanate group.

The unblocking temperature of the blocked isocyanate group is, from the viewpoint of stability of the blocked isocyanate group, preferably 60° C. or more.

From the viewpoint of further improvements in the scratch resistance of images and definition of images, the unblocking temperature of the blocked isocyanate group having an unblocking temperature of 150° C. or less is preferably 120° C. or less, more preferably less than 100° C., still more preferably 90° C. or less.

The blocking agent for forming the blocked isocyanate group having an unblocking temperature of 150° C. or less is selected from the group consisting of compounds having an active hydrogen group.

In this Specification, the active hydrogen group means a hydroxy group, a primary amino group, a secondary amino group, or a thiol group.

The blocking agent is, for example, at least one selected from the group consisting of:
2-methylimidazole (the corresponding blocked isocyanate group has an unblocking temperature of 70° C.),
2-ethylimidazole (the corresponding blocked isocyanate group has an unblocking temperature of 70° C.),
2-mercaptopyridine (the corresponding blocked isocyanate group has an unblocking temperature of 70° C.),
2-hydroxypyridine (the corresponding blocked isocyanate group has an unblocking temperature of 80° C.),
2,2,6,6-tetramethylpiperidine (the corresponding blocked isocyanate group has an unblocking temperature of 80° C.),
4-methylimidazole (the corresponding blocked isocyanate group has an unblocking temperature of 100° C.),
imidazole (the corresponding blocked isocyanate group has an unblocking temperature of 100° C.),
diethylmalonic acid (the corresponding blocked isocyanate group has an unblocking temperature of 100° C.),
2-methylimidazoline (the corresponding blocked isocyanate group has an unblocking temperature of 110° C.),
benzimidazole (the corresponding blocked isocyanate group has an unblocking temperature of 120° C.),
1,1,3,3-tetramethylguanidine (the corresponding blocked isocyanate group has an unblocking temperature of 120° C.),
t-butylethylamine (the corresponding blocked isocyanate group has an unblocking temperature of 120° C.),
t-butylbenzylamine (the corresponding blocked isocyanate group has an unblocking temperature of 120° C.),
3,5-dimethylpyrazole (the corresponding blocked isocyanate group has an unblocking temperature of 120° C.),
diisopropylamine (the corresponding blocked isocyanate group has an unblocking temperature of 130° C.),
dicyclohexylamine (the corresponding blocked isocyanate group has an unblocking temperature of 130° C.),
2,6-dimethylpiperidine (the corresponding blocked isocyanate group has an unblocking temperature of 130° C.),
methyl ethyl ketoxime (the corresponding blocked isocyanate group has an unblocking temperature of 130° C.),
ε-caprolactam (the corresponding blocked isocyanate group has an unblocking temperature of 130° C.),
2-hydroxymethylpyridine (the corresponding blocked isocyanate group has an unblocking temperature of 140° C.), and
N-isopropylcyclohexylamine (the corresponding blocked isocyanate group has an unblocking temperature of 140° C.).

From the viewpoint of further improvements in the scratch resistance of images and definition of images, the blocking agent is particularly preferably at least one selected from the group consisting of 2-methylimidazole, 2-ethylimidazole, 2-mercaptopyridine, 2-hydroxypyridine, and 2,2,6,6-tetramethylpiperidine.

The species of the specified polymer is not particularly limited.

The specified polymer is preferably a urethane polymer, a urea polymer, or a (meth)acrylic polymer.

In this Specification, the urethane polymer means a polymer including a urethane group (except for polymers belonging to a (meth)acrylic polymer described below).

In this Specification, the urea polymer means a polymer including a urea group (except for polymers belonging to the above-described urethane polymer or a (meth)acrylic polymer described below).

In this Specification, the (meth)acrylic polymer means a homopolymer of a single (meth)acrylate, a copolymer of two or more (meth)acrylates, or a copolymer of one or more (meth)acrylates and one or more other monomers.

The concept of the urethane polymer also encompasses a polymer including both of a urethane group and a urea group (what is called, the urethane-urea polymer).

The concept of the (meth)acrylic polymer also encompasses a (meth)acrylic polymer including at least one of a urethane group or a urea group.

The specified polymer may be a chain polymer not having a crosslinked structure (hereafter, also referred to as "specified chain polymer"), or may be a polymer having a crosslinked structure (for example, a three-dimensional crosslinked structure) (hereafter, also referred to as "specified crosslinked polymer").

The specified chain polymer may include, in the main chain, a cyclic structure such as an aliphatic ring, an aromatic ring, or a heterocycle.

Regarding the three-dimensional crosslinked structure optionally present in the specified crosslinked polymer, reference may be made to three-dimensional crosslinked structures described in WO2016/052053A.

A preferred example of the specified polymer is an example in which the specified polymer is a specified chain polymer, and the blocked isocyanate group having an unblocking temperature of 150° C. or less is disposed at an end of the main chain of the specified chain polymer.

This preferred example enables further improvements in the scratch resistance of images and the definition of images.

The reason for this is inferred as follows: the blocked isocyanate group contributing to the scratch resistance of images and the definition of images is disposed at an end of the main chain of the chain polymer, the end being a moiety having high thermal reactivity and high mobility.

Specified Chain Polymer

The specified chain polymer is preferably,
  a reaction product A2 of a blocking agent and a reaction product A1 of at least one selected from the group consisting of bifunctional isocyanate compounds and at least one selected from the group consisting of compounds having two active hydrogen groups and water, or
  a reaction product B2 of a blocking agent and a reaction product B1 of at least one selected from the group consisting of bifunctional isocyanate compounds, at least one selected from the group consisting of compounds having two active hydrogen groups and water, and another compound.

Examples of such a compound having two active hydrogen groups include diol compounds, diamine compounds, and dithiol compounds.

For example, a reaction of a bifunctional isocyanate compound and a diol compound forms urethane groups.

A reaction of a bifunctional isocyanate compound and a diamine compound forms urea groups.

A reaction of a bifunctional isocyanate compound and water forms urea groups.

Examples of the other compound include:
  among polymerizable-group-introducing compounds described later, compounds including a single active hydrogen group alone,
  among polymerizable-group-introduced isocyanate compounds described later, compounds including a single isocyanate group alone,
  among hydrophilic-group-introducing compounds described later, compounds including a single active hydrogen group alone, and
  among hydrophilic-group-introduced isocyanate compounds described later, compounds including a single isocyanate group alone.

Examples of the bifunctional isocyanate compounds for forming the specified chain polymer include the following Compounds (1-1) to (1-20).

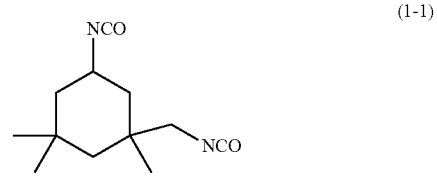

(1-1) IPDI

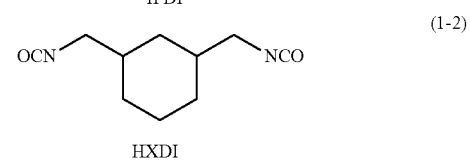

(1-2) HXDI

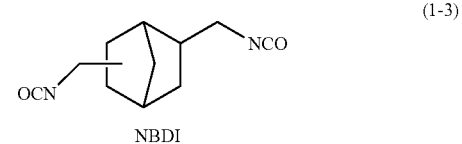

(1-3) NBDI

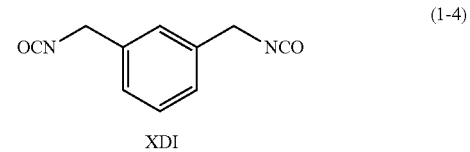

(1-4) XDI

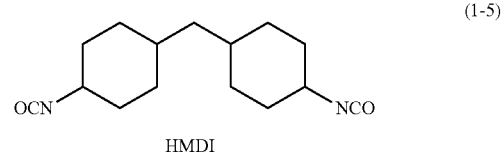

(1-5) HMDI

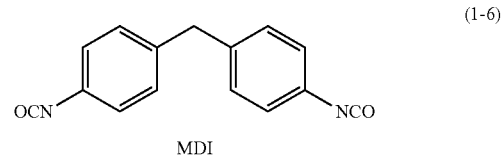

(1-6) MDI

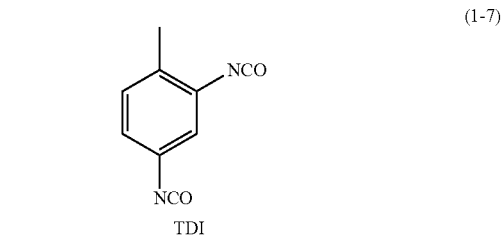

(1-7) TDI

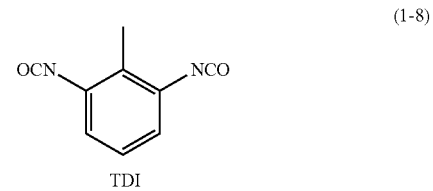

(1-8) TDI

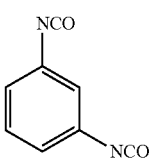
(1-9)
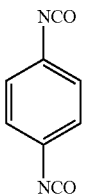
(1-10)
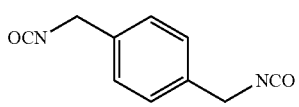
(1-11)
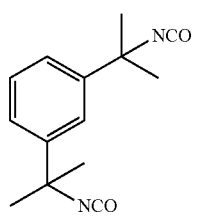
(1-12)
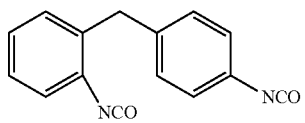
(1-13)
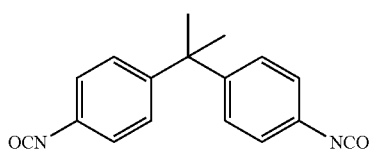
(1-14)
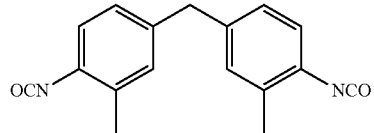
(1-15)
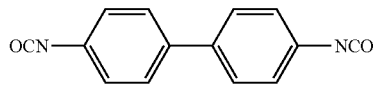
(1-16)
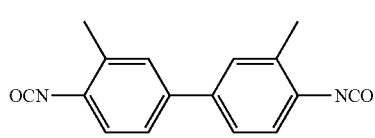
(1-17)
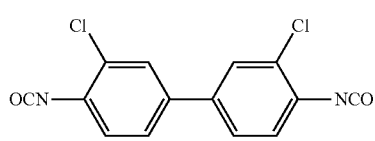
(1-18)
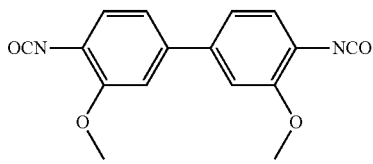
(1-19)
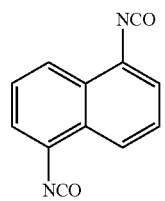
(1-20)
Examples of the compounds intramolecularly having two active hydrogen groups and used for forming the specified chain polymer include the following Compounds (2-1) to (2-24).
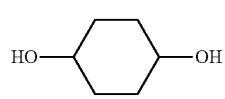
(2-1)
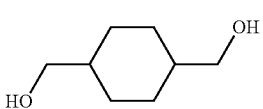
(2-2)
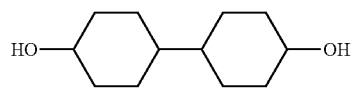
(2-3)
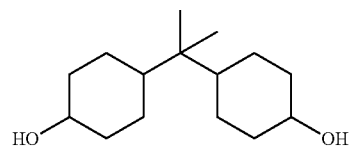
(2-4)
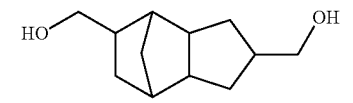
(2-5)
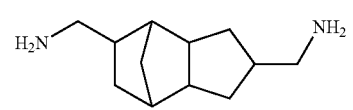
(2-6)
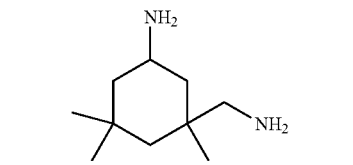
(2-7)
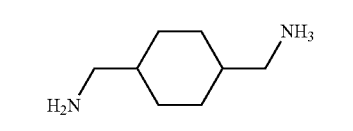
(2-8)
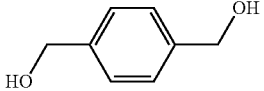
(2-9)

-continued (2-10) 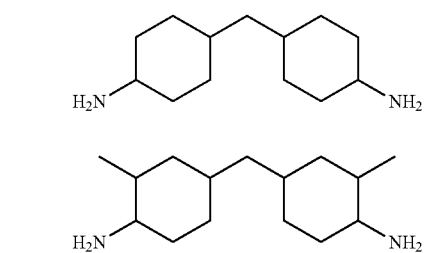

(2-11) 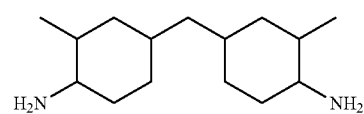

(2-12) 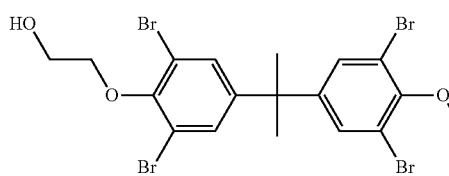

(2-13) 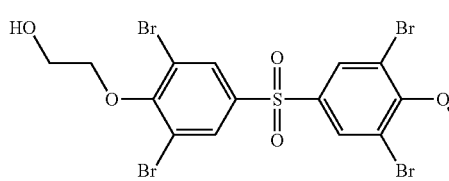

(2-14) 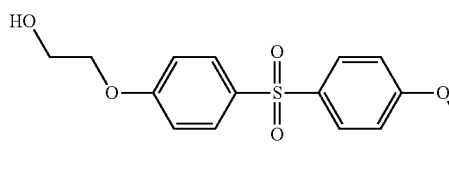

(2-15) 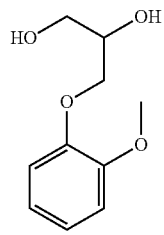

(2-16) 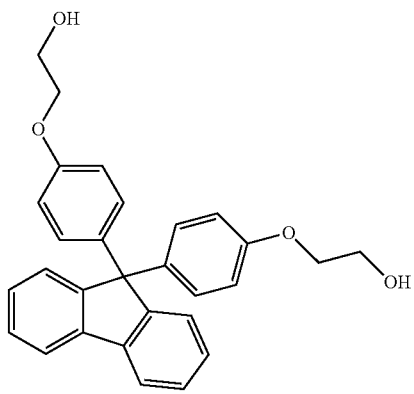

(2-17) 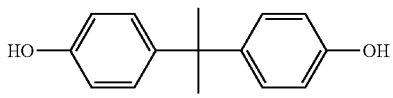

-continued (2-18) 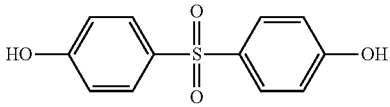

(2-19) 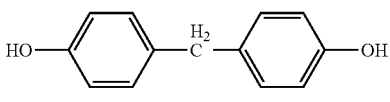

(2-20) 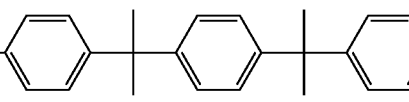

(2-21) 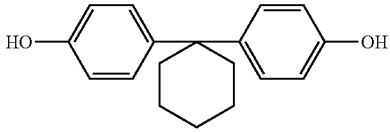

(2-22) 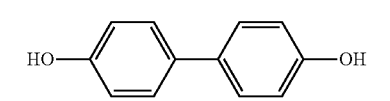

(2-23) 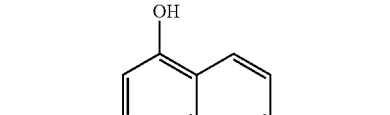

(2-24) 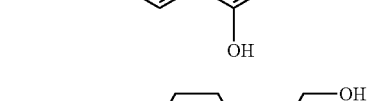

Other examples of the compounds intramolecularly having two active hydrogen groups and used for forming the specified chain polymer include, among polymerizable-group-introducing compounds described later, compounds including two active hydrogen groups, and, among hydrophilic-group-introducing compounds described later, compounds including two active hydrogen groups.

Specified Crosslinked Polymer

The specified crosslinked polymer is preferably, a reaction product C2 of a blocking agent and a reaction product C1 of at least one selected from the group consisting of tri- or higher functional isocyanate compounds and at least one selected from the group consisting of compounds intramolecularly having two or more active hydrogen groups and water, or a reaction product D2 of a blocking agent and a reaction product D1 of at least one selected from the group consisting of tri- or higher functional isocyanate compounds, at least one selected from the group consisting of compounds intramolecularly having two or more active hydrogen groups and water, and another compound.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

When the specified particles include the specified crosslinked polymer, the specified particles preferably include microcapsules (hereafter, "MC") including a shell formed of the specified crosslinked polymer and a core.

Examples of the compound used for forming the specified crosslinked polymer and intramolecularly having two or more active hydrogen groups include, as in the above-described compound intramolecularly having two active hydrogen groups and used for forming the specified chain polymer, diol compounds, diamine compounds, and dithiol compounds.

Other examples of the compound used for forming the specified crosslinked polymer and intramolecularly having two or more active hydrogen groups include tri- or higher functional polyol compounds, tri- or higher functional polyamine compounds, and tri- or higher functional polythiol compounds.

Such a tri- or higher functional isocyanate compound for forming the specified crosslinked polymer is preferably a reaction product of at least one selected from the group consisting of bifunctional isocyanate compounds, and at least one selected from the group consisting of compounds intramolecularly having three or more active hydrogen groups (such as tri- or higher functional polyol compounds, tri- or higher functional polyamine compounds, and tri- or higher functional polythiol compounds).

The number of moles (the number of molecules) of such a bifunctional isocyanate compound that is to react with such a compound intramolecularly having three or more active hydrogen groups is preferably 0.6 or more times, more preferably 0.6 times to 5 times, still more preferably 0.6 times to 3 times, still more preferably 0.8 times to 2 times, the number of moles of the active hydrogen groups (the number of equivalents of the active hydrogen groups) of the compound intramolecularly having three or more active hydrogen groups.

Examples of the bifunctional isocyanate compound for forming the tri- or higher functional isocyanate compound include the same as those described above for the bifunctional isocyanate compound for forming the specified chain polymer.

Examples of the compound intramolecularly having three or more active hydrogen groups for forming the tri- or higher functional isocyanate compound include compounds having structures represented by the following (H-1) to (H-13). In the following structures, n represents an integer selected from the group consisting of 1 to 100.

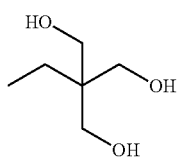

(H-1)

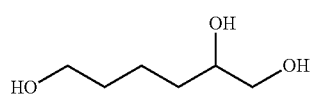

(H-2)

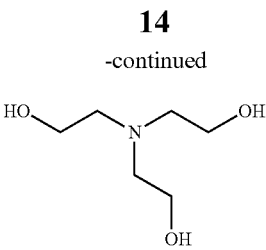

(H-3)

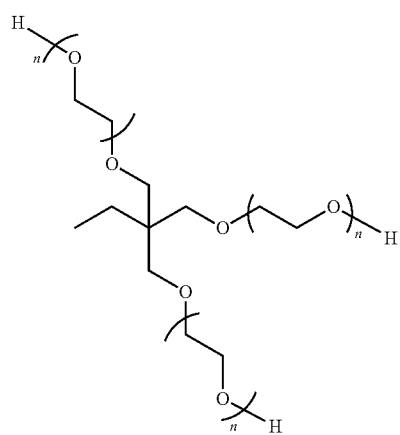

(H-4)

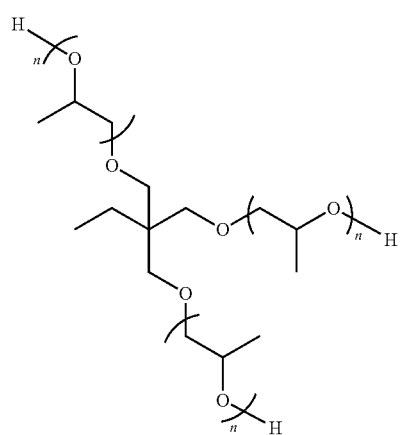

(H-5)

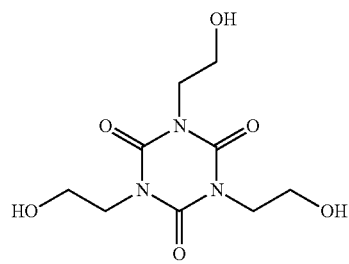

(H-6)

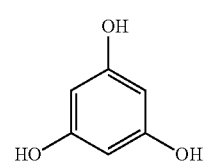

(H-7)

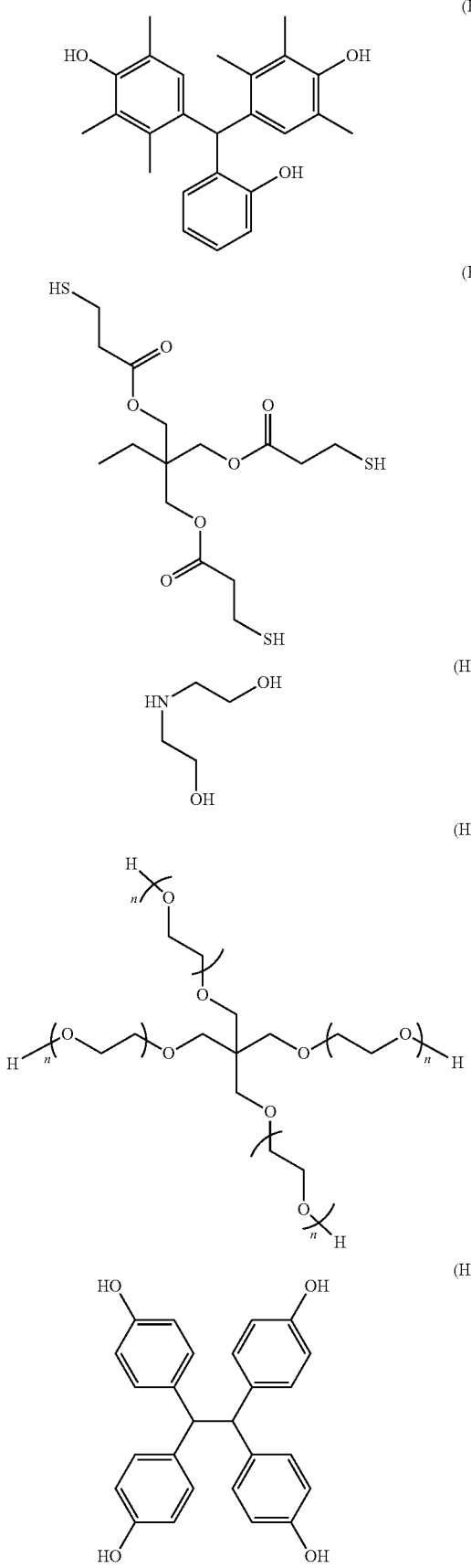

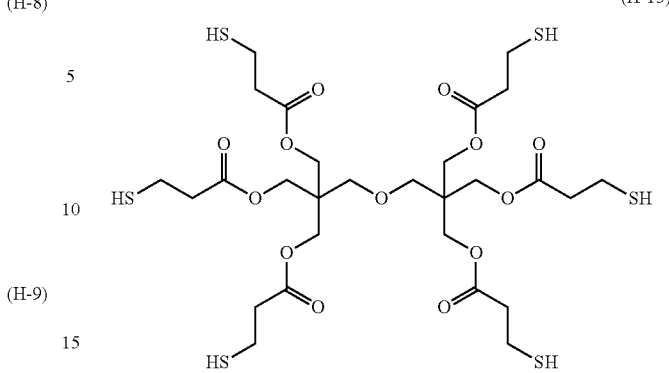

Examples of the tri- or higher functional isocyanate compound for forming the specified crosslinked polymer include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of the commercially available products of the isocyanurate-type tri- or higher functional isocyanate compounds include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), and DURANATE (registered trademark) TPA-100, TKA-100, TSA-100, TSS-100, TLA-100, and TSE-100 (all from Asahi Kasei Corporation).

Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

When the specified particles include MC (namely, microcapsules) including a shell formed of the specified crosslinked polymer and a core, the specified particles may contain, as a dispersing agent for MC, among the above-described specified chain polymers, a specified chain polymer having a hydrophilic group. In this case, in the ink, the peripheries of the shells of MC can be at least partially covered with the specified chain polymer serving as a dispersing agent. In this case, an interaction between a urethane group and/or a urea group of the shells of MC and a urethane group and/or a urea group of the dispersing agent (specified chain polymer), and the dispersing effect exerted by the hydrophilic group of the dispersing agent synergistically provide higher dispersion stability of the specified particles.

In this case, the ratio of the amount of the dispersing agent to the total solid-content amount of MC (hereafter, also referred to as the mass ratio [dispersing agent/MC solid content]) is preferably 0.005 to 1.000, more preferably 0.05 to 0.7.

When the mass ratio [dispersing agent/MC solid content] is 0.005 or more, the specified particles exhibit higher dispersion stability.

When the mass ratio [dispersing agent/MC solid content] is 1.000 or less, the image has higher hardness.

Preferred Weight-Average Molecular Weight (Mw) of Specified Polymer

The weight-average molecular weight (Mw) of the specified polymer is, from the viewpoint of the dispersion stability of the ink (specifically, the dispersion stability of the specified particles), preferably 5000 or more, more preferably 7000 or more, still more preferably 8000 or more.

The upper limit of Mw of the specified polymer is not particularly limited. The upper limit of Mw of the specified polymer is, for example, 150000, 100000, 70000, or 50000.

In this Specification, the weight-average molecular weight (Mw) is a value measured by gel permeation chromatography (GPC). However, when the molecular weight Mw of a compound is too low to be accurately measured by GPC, the molecular weight determined from the chemical structure of the compound is employed as the Mw of the compound.

In this Specification, measurement by gel permeation chromatography (GPC) can be performed with a measurement device of an HLC (registered trademark)-8020GPC (Tosoh Corporation), three columns of TSK-gel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

The specified polymer content relative to the total solid-content amount of the specified particles is preferably 10 mass % or more, more preferably 20 mass % or more.

When the specified polymer content relative to the total solid-content amount of the specified particles is 10 mass % or more, the ink has higher dispersion stability (specifically, the dispersion stability of the specified particles).

The specified polymer content relative to the total solid-content amount of the specified particles may be 100 mass %, but is preferably 80 mass % or less, more preferably 70 mass % or less, particularly preferably 50 mass % or less.

Polymerizable Group

The specified polymer preferably has at least one polymerizable group species.

When the specified polymer has a polymerizable group, it provides images having higher curability during curing of the images, which results in higher scratch resistance of the images.

The polymerizable group is preferably a photopolymerizable group or a thermal-polymerizable group.

The photopolymerizable group is preferably a radical-polymerizable group, more preferably a group including an ethylenically double bond, still more preferably a (meth) acryloyl group, an allyl group, a styryl group, or a vinyl group. The radical-polymerizable group is, from the viewpoint of radical polymerization reactivity and the hardness of a film to be formed, particularly preferably a (meth) acryloyl group.

The thermal-polymerizable group is preferably an epoxy group, an oxetanyl group, an aziridinyl group, an azetidinyl group, a ketone group, an aldehyde group, or a blocked isocyanate group.

The specified polymer may contain one polymerizable group species alone, or may contain two or more polymerizable group species.

The fact that the specified polymer has a polymerizable group can be confirmed by, for example, Fourier transform infrared spectroscopy (FT-IR).

Polymerizable-Group-Introducing Compound

In the case of the specified polymer having a polymerizable group, the polymerizable group can be introduced into the specified polymer by using a polymerizable-group-introducing compound.

The polymerizable-group-introducing compound may be a compound having a polymerizable group and an active hydrogen group.

The polymerizable-group-introducing compound is preferably a compound having one or more polymerizable groups and two or more active hydrogen groups.

The method of introducing a polymerizable group into the specified polymer is not particularly limited. A particularly preferred method is, during synthesis of the specified polymer, to cause a reaction of at least one selected from the group consisting of bifunctional isocyanate compounds, at least one selected from the group consisting of water, diol compounds, diamine compounds, and dithiol compounds, and at least one polymerizable-group-introducing compound (and optionally at least one hydrophilic-group-introducing compound).

Such polymerizable-group-introducing compound species may be used alone or in combination of two or more thereof.

Other examples of the polymerizable-group-introducing compound include compounds described in Paragraphs 0075 to 0089 of WO2016/052053A.

The polymerizable-group-introducing compound is preferably a compound represented by the following formula (ma).

$$L^1Lc_mZ_n \quad (ma)$$

In the formula (ma), $L^1$ represents an m+n-valent linking group; m and n each independently represent an integer selected from the group consisting of 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

m and n each independently represent preferably 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

The active hydrogen group represented by Z is more preferably a hydroxy group or a primary amino group, still more preferably a hydroxy group.

The following are examples of the polymerizable-group-introducing compound; however, the polymerizable-group-introducing compound is not limited to the following examples. Incidentally, n's in Compounds (a-3) and (a-14) represent, for example, an integer selected from the group consisting of 1 to 90.
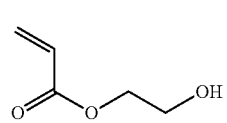
(a-1)
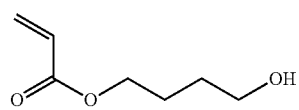
(a-2)
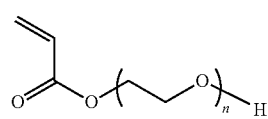
(a-3)
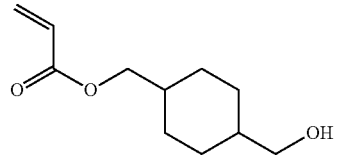
(a-4)
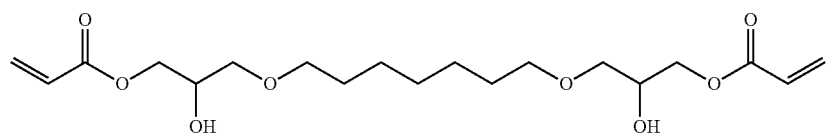
(a-5)
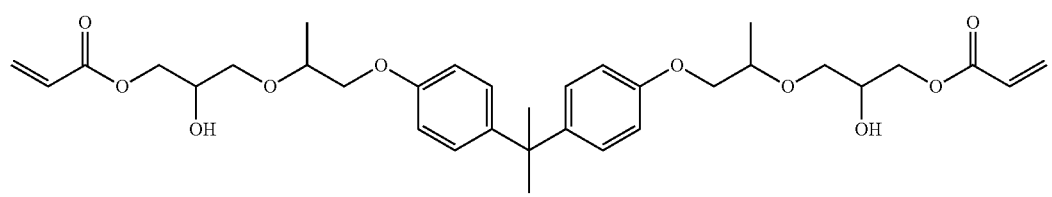
(a-6)
DA-250
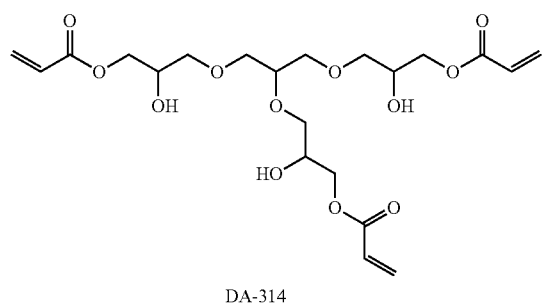
(a-7)
DA-314
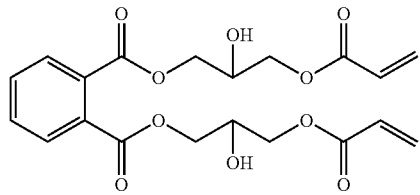
(a-8)
DA-721
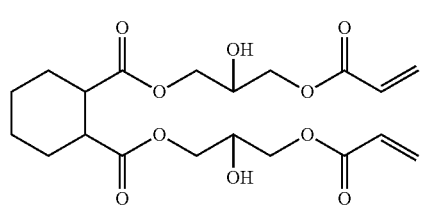
(a-9)
DA-722
(a-10)
n = 1
DA-911M
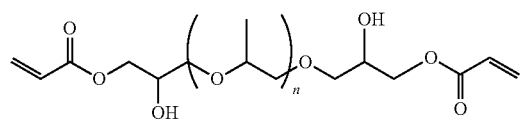
(a-11)
n = 3
DA-920
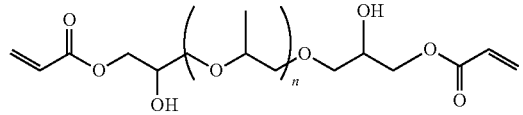
(a-12)
n = 11
DA-931

-continued
(a-13)
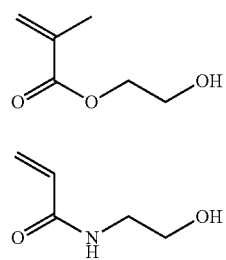
(a-14)
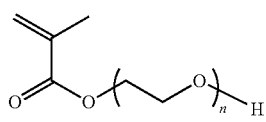
(a-15)
(a-16)
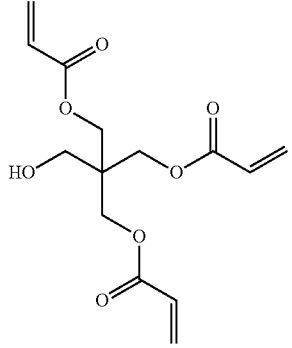
A-TMM-3L
(a-17)
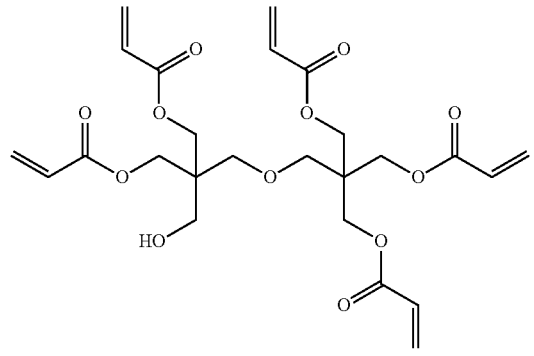
SR399E
(a-18)
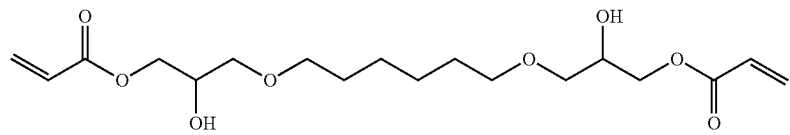
(a-19)
(a-20)
(a-21)
(a-22)
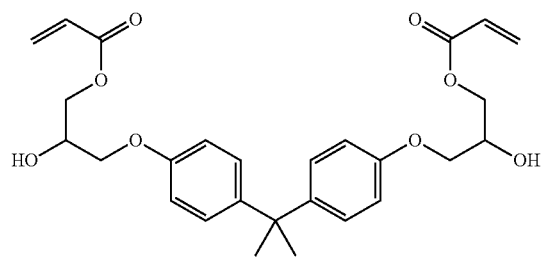
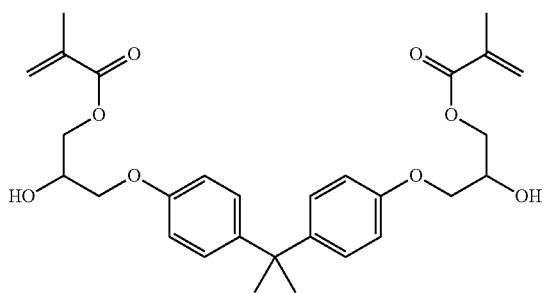

Polymerizable-Group-Introduced Isocyanate Compound

In the case of the specified polymer having a polymerizable group, the polymerizable group can also be introduced into the specified polymer by using a polymerizable-group-introduced isocyanate compound.

Examples of the polymerizable-group-introduced isocyanate compound include:

a reaction product of at least one of the above-described polymerizable-group-introducing compounds, and at least one of bifunctional isocyanate compounds;

a reaction product of at least one of the above-described polymerizable-group-introducing compounds, and at least one of tri- or higher functional isocyanate compounds; and a reaction product of at least one of the above-described polymerizable-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Hydrophilic Group

The specified polymer may have at least one hydrophilic group species.

When the specified polymer has a hydrophilic group, the ink has higher dispersion stability (for example, preservation stability and ejection stability).

The hydrophilic group is preferably an anionic group or a nonionic group, and, from the viewpoint of a strong effect of providing higher dispersion stability, preferably an anionic group.

For example, a comparison between an anionic group and a nonionic group of the same molecular weight reveals that the anionic group exerts a stronger effect of providing higher dispersion stability. Thus, an anionic group (particularly preferably at least one selected from the group consisting of a carboxy group and salts of a carboxy group), even in the case of having a low molecular weight, can sufficiently exert the effect of providing higher dispersion stability.

The nonionic group may be a group having a polyether structure, preferably a monovalent group including a polyalkyleneoxy group.

The anionic group may be an unneutralized anionic group, or may be a neutralized anionic group.

Examples of the unneutralized anionic group include a carboxy group, a sulfo group, a sulfuric acid group, a phosphonic acid group, and a phosphoric acid group.

Examples of the neutralized anionic group include salts of a carboxy group, salts of a sulfo group, salts of a sulfuric acid group, salts of a phosphonic acid group, and salts of phosphoric acid group.

In this Specification, "a carboxy group is neutralized" means that a carboxy group as an anionic group is turned into the form of a "salt" (for example, "—COONa"). The same applies to, as anionic groups, a sulfo group, a sulfuric acid group, a phosphonic acid group, and a phosphoric acid group.

The neutralization may be achieved by using, for example, an alkali metal hydroxide (for example, sodium hydroxide or potassium hydroxide) or an organic amine (for example, triethylamine).

The anionic group that can be included in the specified polymer is, from the viewpoint of dispersion stability, preferably at least one selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group, more preferably at least one selected from the group consisting of a carboxy group and salts of a carboxy group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the specified polymer has a neutralized anionic group, the neutralization degree of the anionic group (such as a carboxy group) of the specified polymer is preferably 50% to 100%.

In this Specification, the "neutralization degree of the anionic group" means, for all the anionic groups of the specified polymer, a ratio of the number of moles of neutralized anionic groups to the total of the number of moles of neutralized anionic groups and the number of moles of unneutralized anionic groups [Number of moles of neutralized acidic groups/(Number of moles of neutralized acidic groups+Number of moles of unneutralized acidic groups)].

When the neutralization degree of the anionic group is 50% or more, the specified particles have higher dispersion stability.

The neutralization degree of the anionic group is preferably 50% to 95%, more preferably 80% to 95%, still more preferably 90% to 95%.

The neutralized anionic group (specifically, the anionic group in the form of salt) exhibits basicity. When the neutralization degree of the anionic group is 95% or less, hydrolysis of a urethane group and/or a urea group that can be included in the specified polymer can be further suppressed.

The neutralization degree can be determined by neutralization titration.

When the specified polymer includes, as a hydrophilic group, an anionic group (for example, at least one species selected from the group consisting of a carboxy group and salts of a carboxy group), and the number of millimoles of an anionic group in 1 g of the specified polymer (for example, the total number of millimoles of a carboxy group and a salt of a carboxy group) is defined as the acid value of the specified polymer, the acid value of the specified polymer is, from the viewpoint of the dispersion stability of the specified particles, preferably 0.10 mmol/g to 2.00 mmol/g, more preferably 0.30 mmol/g to 1.50 mmol/g.

Hydrophilic-Group-Introducing Compound

In the case of the specified particles in which the specified polymer has a hydrophilic group, the hydrophilic group can be introduced into the specified polymer by using a hydrophilic-group-introducing compound.

The hydrophilic-group-introducing compound may be a compound having a hydrophilic group and an active hydrogen group.

The hydrophilic-group-introducing compound is preferably a compound having one or more hydrophilic groups and two or more active hydrogen groups.

Among hydrophilic-group-introducing compounds, examples of anionic-group-introducing compounds include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the anionic-group-introducing compounds include, in addition to the above-described α-amino acids, the following specific examples.

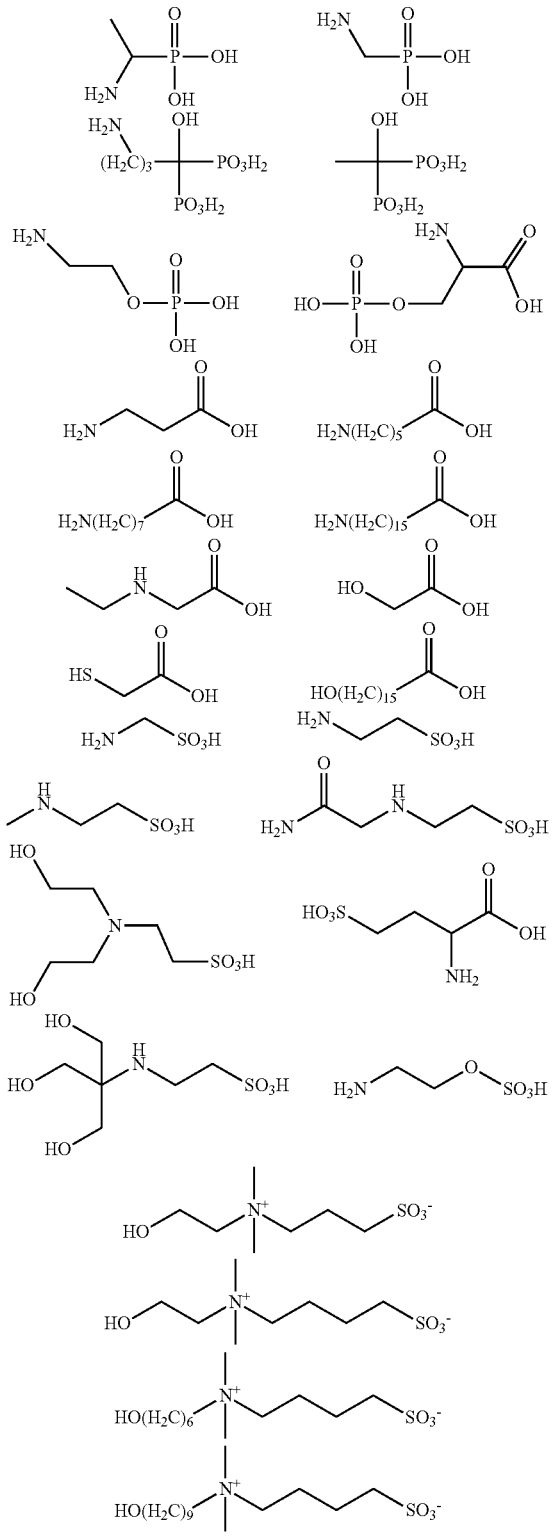

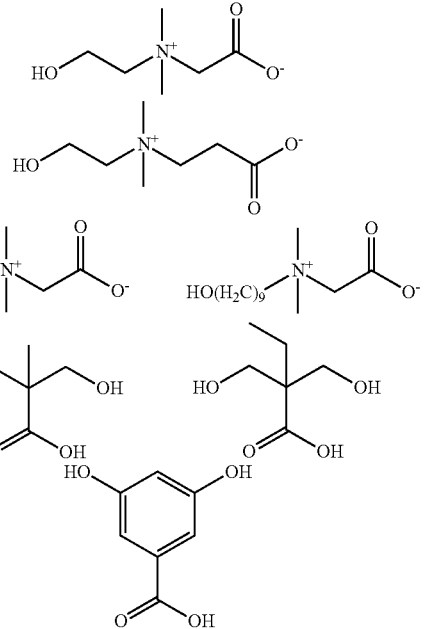

In such an anionic-group-introducing compound, the anionic group may be at least partially neutralized using, for example, an inorganic base such as sodium hydroxide or potassium hydroxide, or an organic base such as triethylamine.

Among the hydrophilic-group-introducing compounds, the nonionic-group-introducing compound is preferably a compound having a polyether structure, more preferably a compound having a polyoxyalkylene group.

Hydrophilic-Group-Introduced Isocyanate Compound

In the case of the specified particles in which the specified polymer has a hydrophilic group, the hydrophilic group can also be introduced into the specified polymer by using a hydrophilic-group-introduced isocyanate compound.

Examples of the hydrophilic-group-introduced isocyanate compound include:
a reaction product of at least one of the above-described hydrophilic-group-introducing compounds, and at least one of bifunctional isocyanate compounds;
a reaction product of at least one of the above-described hydrophilic-group-introducing compounds, and at least one of tri- or higher functional isocyanate compounds; and
a reaction product of at least one of the above-described hydrophilic-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Specific examples of the hydrophilic-group-introduced isocyanate compound include adducts of trimethylolpropane (TMP), m-xylylene diisocyanate (XDI), and polyethylene glycol monomethyl ether (EO) (for example, TAKENATE (registered trademark) D-116N, manufactured by Mitsui Chemicals, Inc.).

Polymerizable Monomer

The specified particles include a polymerizable monomer. This imparts curability to the ink (specifically, images formed of the ink are curable), to thereby provide images having higher scratch resistance.

The polymerizable monomer included in the specified particles may be one species alone, or two or more species.

The polymerizable monomer included in the specified particles may be compounds described in Paragraphs 0097 to 0105 of WO2016/052053A.

The polymerizable monomer included in the specified particles is preferably a photopolymerizable monomer or a thermal-polymerizable monomer.

The photopolymerizable monomer has properties of being polymerized upon irradiation with light (namely, an actinic energy ray).

The thermal-polymerizable monomer has properties of being polymerized upon heating or irradiation with infrared radiation.

The photopolymerizable monomer is preferably a radical-polymerizable monomer having an ethylenically double bond that enables radical polymerization.

In this Specification, inks in which the specified particles include a photopolymerizable monomer are sometimes referred to as "photocurable inks", while inks in which the specified particles include a thermal-polymerizable monomer are sometimes referred to as "thermosetting inks".

The ink film formed of the ink according to the present disclosure can be cured by, in a case where the ink according to the present disclosure is a photocurable ink, irradiating the ink film with light (refer to a curing step A described later), or, in a case where the ink according to the present disclosure is a thermosetting ink, heating or irradiating the ink film with infrared radiation (refer to a heating step or a curing step B described later).

A preferred example of the photocurable ink is an example in which the specified particles include a photopolymerizable monomer, and the specified polymer has a photopolymerizable group.

This provides higher curability of images upon irradiation with an actinic energy ray, which results in higher scratch resistance of images.

When the specified particles include, as the polymerizable monomer, a photopolymerizable monomer, the specified particles preferably further include a photopolymerization initiator described later.

When the specified particles include, as the polymerizable monomer, a thermal-polymerizable monomer, the specified particles may further include a photothermal conversion agent, a thermal curing accelerator, or a photothermal conversion agent and a thermal curing accelerator described later.

The content (total content in the case of including two or more species) of the polymerizable monomer included in the specified particles relative to the total solid-content amount of the specified particles is, from the viewpoint of providing a film having higher curing sensitivity and higher hardness, preferably 10 mass % to 90 mass %, more preferably 20 mass % to 80 mass %, still more preferably 30 mass % to 70 mass %.

In this Specification, the total solid-content amount of the specified particles means, in a case where the specified particles do not include solvents, the total amount of the specified particles, and, in a case where the specified particles include a solvent, the total amount of the specified particles except for the solvent.

The polymerizable monomer preferably has a molecular weight of 100 to 4000, more preferably 100 to 2000, more preferably 100 to 1000, more preferably 100 to 900, more preferably 100 to 800, particularly preferably 150 to 750.

Photopolymerizable Monomer

The photopolymerizable monomer can be selected from the group consisting of a polymerizable monomer having an ethylenically unsaturated bond that enables radical polymerization (namely, a radical-polymerizable monomer) and a polymerizable monomer having a cationic-polymerizable group that enables cationic polymerization (namely, a cationic-polymerizable monomer).

Examples of the radical-polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The radical-polymerizable monomer is preferably a compound having an ethylenically unsaturated group.

When the specified particles include the radical-polymerizable monomer, the specified particles may include a single radical-polymerizable monomer species alone, or may include two or more radical-polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stil acrylate, isostearyl acrylate, 2-ethylhexyldiglycol acrylate, 2-hydroxybutyl acrylate, 2-acryloyloxyethylhydrophthalic acid, ethoxy diethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethylsuccinic acid, 2-acryloyloxyphthalic acid, 2-acryloxyethyl-2-hydroxyethylphthalic acid, lactone-modified acrylate, acryloyl morpholine, acrylamide, and substituted acrylamide (such as N-methylol acrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxy neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl)

isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methylstyrene, α-methylstyrene, and p-methoxy-β-methylstyrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the radical-polymerizable monomer include allyl glycidyl ether, diallyl phthalate, triallyl trimellitate, and N-vinylamide such as N-vinylformamide.

Of these radical-polymerizable monomers, the bi- or lower functional radical-polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional radical-polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The specified particles may include a combination of a bi- or lower functional radical-polymerizable monomer and a tri- or higher functional radical-polymerizable monomer. In this case, the bi- or lower functional radical-polymerizable monomer contributes to adhesion between the image and the substrate, and the tri- or higher functional radical-polymerizable monomer contributes to improvement in the hardness of the image.

The combination of the bi- or lower functional radical-polymerizable monomer and the tri- or higher functional radical-polymerizable monomer is, for example, the combination of a bifunctional acrylate compound and a trifunctional acrylate compound, the combination of a bifunctional acrylate compound and a pentafunctional acrylate compound, or the combination of a monofunctional acrylate compound and a tetrafunctional acrylate compound.

From the viewpoint of providing higher adhesion between the image and the substrate, at least one species of the radical-polymerizable monomer that can be included in the specified particles is preferably a radical-polymerizable monomer having a cyclic structure (hereafter, also referred to as "cyclic radical-polymerizable monomer").

Examples of the cyclic radical-polymerizable monomer include cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, and ε-caprolactone-modified tris-(2-acryloxyethyl) isocyanurate.

The examples further include bi- or higher functional cyclic radical-polymerizable monomers described below.

From the viewpoint of providing higher adhesion between the image and the substrate, at least one species of the radical-polymerizable monomer that can be included in the specified particles is preferably a polymerizable monomer including, in a single molecule, one or more cyclic structures and two or more (meth)acryloyl groups (hereafter, also referred to as "bi- or higher functional cyclic radical-polymerizable monomer").

Examples of the bi- or higher functional cyclic radical-polymerizable monomer include:
tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a radical-polymerizable monomer, the percentage of a bi- or higher functional cyclic radical-polymerizable monomer relative to the whole polymerizable monomer is preferably 10 mass % to 100 mass %, more preferably 30 mass % to 100 mass %, particularly preferably 40 mass % to 100 mass %.

In addition to the above-described radical-polymerizable monomers, there are other usable radical-polymerizable monomers such as commercially available products described in, for example, "Crosslinking agent handbook", edited by Shinzo YAMASHITA (1981, TAISEISHA LTD.) "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.) and radical-polymerizable and crosslinkable monomers publicly known in the industry.

Examples of the cationic-polymerizable monomer include an epoxy compound, a vinyl ether compound, and an oxetane compound.

The cationic-polymerizable monomer is preferably a compound having at least one olefin, thioether, acetal, thioxane, thietane, aziridine, N heterocycle, O heterocycle, S heterocycle, P heterocycle, aldehyde, lactam, or cyclic ester group.

The cationic-polymerizable monomer may be compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

There are also photopolymerizable monomers that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These monomers are also applicable as polymerizable monomers that can be included in the specified particles.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N(NDDA, bifunctional), A-DOD-N(DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all from Nippon Kayaku Co., Ltd.).

In addition, preferred examples of the polymerizable monomer include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.) V-CAP (BASF), and VISCOAT #192 (OSAKA ORGANIC CHEMICAL INDUSTRY LTD.).

Among these commercially available products, in particular, preferred are photopolymerizable monomers having a cyclic structure that are SR506, SR833S, A-9300, and A-9300-CL, particularly preferred is SR833S.

Thermal-Polymerizable Monomer

The thermal-polymerizable monomer can be selected from the group consisting of polymerizable monomers that can be polymerized by being heated or irradiated with infrared radiation. Examples of the thermal-polymerizable monomer include compounds such as epoxy compounds, oxetane compounds, aziridine compounds, azetidine compounds, ketone compounds, aldehyde compounds, and blocked isocyanate compounds.

Examples of the epoxy compounds include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

A commercially available product of the epoxy compounds may be EPICLON (registered trademark) 840 (DIC Corporation).

Examples of the oxetane compounds include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compounds include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (dimethylamine, diisopropylamine, di-n-propylamine, and diisobutylamine), alicyclic amine (such as methylhexylamine and dicyclohexylamine), and aromatic amine (such as aniline and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole and 2-methylimidazole], pyrazole [such as pyrazole, 3-methylpyrazole, and 3,5-dimethylpyrazole], imine [such as ethyleneimine and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, the blocking agent is preferably oxime, lactam, pyrazole, active methylene, or amine.

The blocked isocyanate compounds may be commercially available products on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph 0064 in WO2015/158654A.

The specified particles including the specified polymer and the polymerizable monomer can be produced by, for example, mixing an oil-phase component including the specified polymer and the polymerizable monomer, and an aqueous-phase component, and emulsifying the resultant mixture.

Photopolymerization Initiator

The specified particles may include at least one photopolymerization initiator.

When the specified particles include a photopolymerizable monomer (for example, a radical-polymerizable monomer), the specified particles preferably include at least one photopolymerization initiator.

When the specified particles include a photopolymerization initiator, the resultant image has higher sensitivity to light (namely, an actinic energy ray), hence has higher hardness and higher adhesion to the substrate.

Specifically, when the specified particles include a photopolymerization initiator, each specified particle has both of a photopolymerizable monomer and a photopolymerization initiator. Thus, the photopolymerizable monomer and the photopolymerization initiator are in close proximity to each other, so that, compared with the cases of using existing photocurable compositions, the film has higher curing sensitivity (hereafter, also simply referred to as "sensitivity"). As a result, the resultant film has higher hardness and higher adhesion to the substrate.

When the specified particles include a photopolymerization initiator, photopolymerization initiators that have high sensitivity but have low dispersibility or low solubility in water and hence have been difficult to use become usable (for example, a photopolymerization initiator having a solubility of 1.0 mass % or less in water at 25° C.). As a result, photopolymerization initiators used can be selected with a higher degree of freedom, which results in an increase in the degree of freedom of selecting light sources used. This can provide higher curing sensitivity.

The above-described photopolymerization initiators that have high sensitivity but have low dispersibility or low solubility in water and hence have been difficult to use are, for example, specifically carbonyl compounds and acylphosphine oxide compounds described later, preferably acylphosphine oxide compounds.

In this way, in the ink according to the present disclosure, the specified particles are prepared so as to include a substance having a low solubility in water, so that the substance is contained in the ink according to the present disclosure, which is an aqueous composition. This is another advantage of the ink according to the present disclosure.

The ink according to the embodiment in which the specified particles include a photopolymerization initiator also has higher preservation stability than existing photocurable compositions. The probable reason for this is that the photopolymerization initiator is included in the specified particles, which results in suppression of aggregation or sedimentation of the photopolymerization initiator.

The photopolymerization initiator that can be included in the specified particles may be appropriately selected from publicly known photopolymerization initiators.

The photopolymerization initiator is a compound that absorbs light (namely, an actinic energy ray) to generate a radical serving as a polymerization initiation species.

The photopolymerization initiator may be a publicly known compound. Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above-described compounds (a) to (m) may be used alone or in combination of two or more thereof.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-S61-194062A), acylphosphine sulfide described in JP1990-9597B (JP-H2-9597B), acylphosphine described in JP1990-9596B (JP-H2-9596B), thioxanthones described in JP1988-61950B (JP-S63-61950B), and coumarins described in JP1984-42864B (JP-S59-42864B).

Also preferred are polymerization initiators described in JP2008-105379A and JP2009-114290A.

Examples of commercially available products of the photopolymerization initiator include IRGACURE (registered trademark) 184, 369, 500, 651, 819, 907, 1000, 1300, 1700, 1870, DAROCUR (registered trademark) 1173, 2959, 4265, ITX, LUCIRIN (registered trademark) TPO [all manufactured by BASF], ESACURE (registered trademark) KTO37, KTO46, KIP150, EDB [all manufactured by Lamberti S.p.A.], H-Nu (registered trademark) 470, 470X [all manufactured by Spectra Group Limited], OMNIPOL TX, 9210 [all manufactured by IGM Resins B.V.], and SPEEDCURE 7005, 7010, and 7040 [all manufactured by LAMBSON Limited].

Among these photopolymerization initiators, more preferred are (a) carbonyl compounds or (b) acylphosphine oxide compounds; specific examples include bis(2,4,6-trimethylbenzoyl)-phenylphosphine oxide (such as IRGACURE (registered trademark) 819, manufactured by BASF), 2-(dimethylamino)-1-(4-morpholinophenyl)-2-benzyl-1-butanone (such as IRGACURE (registered trademark) 369, manufactured by BASF), 2-methyl-1-(4-methylthiophenyl)-2-morpholinopropan-1-one (such as IRGACURE (registered trademark) 907, manufactured by BASF), 1-hydroxycyclohexyl-phenyl-ketone (such as IRGACURE (registered trademark) 184, manufactured by BASF), and 2,4,6-trimethylbenzoyl-diphenyl-phosphine oxide (such as DAROCUR (registered trademark) TPO and LUCIRIN (registered trademark) TPO (both manufactured by BASF)).

Of these, from the viewpoint of, for example, higher sensitivity and suitability for LED light, the photopolymerization initiator internally included is preferably the (b) acylphosphine oxide compounds, more preferably monoacylphosphine oxide compounds (particularly preferably, 2,4,6-trimethylbenzoyl-diphenyl-phosphine oxide), or bisacylphosphine oxide compounds (particularly preferably, bis(2,4,6-trimethylbenzoyl)-phenylphosphine oxide).

The LED light preferably has a wavelength of 355 nm, 365 nm, 385 nm, 395 nm, or 405 nm.

Alternatively, from the viewpoint of suppression of migration, the photopolymerization initiator is preferably a polymeric photopolymerization initiator.

Examples of the polymeric photopolymerization initiator include the above-described Omnipol TX and 9210; and SPEEDCURE 7005, 7010, and 7040.

The specified particles including a photopolymerization initiator can be produced by, for example, mixing an oil-phase component including a specified polymer, a photopolymerizable monomer, and a photopolymerization initiator, and an aqueous-phase component, and emulsifying the resultant mixture.

The photopolymerization initiator content relative to the total solid-content amount of the specified particles is preferably 0.1 mass % to 25 mass %, more preferably 0.5 mass % to 20 mass %, still more preferably 1 mass % to 15 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator caused by irradiation with light (namely, an actinic energy ray) can be further promoted.

The sensitizer is a substance that absorbs a specific actinic energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include compounds represented by General formula (i) in JP2010-24276A, and compounds represented by General formula (I) in JP1994-107718A (JP-H6-107718A).

Of these, from the viewpoint of suitability for LED light and reactivity to a photopolymerization initiator, the sensitizer is preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, such sensitizers may be included alone or in combination of two or more thereof.

When the specified particles include a sensitizer, the sensitizer content relative to the total solid-content amount of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, mixing an oil-phase component including a specified polymer, a photopolymerizable monomer, a photopolymerization initiator, and a sensitizer, and an aqueous-phase component, and emulsifying the resultant mixture.

Photothermal Conversion Agent

When the specified particles include, as a polymerizable monomer, a thermal-polymerizable monomer, the specified particles may include at least one photothermal conversion agent.

The photothermal conversion agent is a compound that absorbs infrared radiation or the like to generate heat, to polymerize and cure a thermal-polymerizable monomer. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

The specified particles including a photothermal conversion agent can be produced by, for example, mixing an oil-phase component including a specified polymer, a thermal-polymerizable monomer, and a photothermal conversion agent, and an aqueous-phase component, and emulsifying the resultant mixture.

Such photothermal conversion agents may be used alone or in combination of two or more thereof.

The photothermal conversion agent content relative to the total solid-content amount of the specified particles is preferably 0.1 mass % to 25 mass %, more preferably 0.5 mass % to 20 mass %, still more preferably 1 mass % to 15 mass %.

Thermal Curing Accelerator

When the specified particles include, as the polymerizable monomer, a thermal-polymerizable monomer, the specified particles may include at least one thermal curing accelerator.

The thermal curing accelerator is a compound that catalytically promotes the thermosetting reaction of a thermal-polymerizable monomer.

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole (such as phenylimidazole or 2-methylimidazole), and pyrazole.

The specified particles including a thermal curing accelerator can be produced by, for example, mixing an oil-phase component including a specified polymer, a thermal-polymerizable monomer, and a thermal curing accelerator, and an aqueous-phase component, and emulsifying the resultant mixture.

Such thermal curing accelerators may be used alone or in combination of two or more thereof.

The thermal curing accelerator content relative to the total solid-content amount of the specified particles is preferably 0.1 mass % to 25 mass %, more preferably 0.5 mass % to 20 mass %, still more preferably 1 mass % to 15 mass %.

In the ink according to the present disclosure, the total solid-content amount of the specified particles relative to the total solid-content amount of the ink is preferably 50 mass % or more, more preferably 60 mass % or more, still more preferably 70 mass % or more, still more preferably 80 mass % or more, still more preferably 85 mass % or more.

This provides higher dispersion stability and higher adhesion between the image and the substrate.

In the ink according to the present disclosure, the total solid-content amount of the specified particles relative to the total amount of the ink is preferably 1 mass % to 50 mass %, more preferably 3 mass % to 40 mass %, still more preferably 5 mass % to 30 mass %.

When the total solid-content amount of the specified particles relative to the total amount of the ink is 1 mass % or more, higher adhesion between the image and the substrate is provided.

When the total solid-content amount of the specified particles relative to the total amount of the ink is 50 mass % or less, the ink has higher dispersion stability.

The volume-average dispersed-particle size of the specified particles is not particularly limited, but is, from the viewpoint of dispersion stability, preferably 0.01 µm to 10.0 µm, more preferably 0.01 µm to 5 µm, still more preferably 0.05 µm to 1 µm, still more preferably 0.05 µm to 0.5 µm, still more preferably 0.05 µm to 0.3 µm.

In this Specification, the "volume-average dispersed-particle size" means a value measured by a light scattering method. The measurement of the volume-average dispersed-particle size of the specified particles by the light scattering method is performed with, for example, LA-960 (HORIBA, Ltd.).

Water

The ink according to the present disclosure contains water.

The water serves as a dispersion medium of the specified particles (dispersoid).

The water content of the ink according to the present disclosure is not particularly limited. The water content relative to the total amount of the ink is preferably 10 mass % to 99 mass %, more preferably 20 mass % to 95 mass %, still more preferably 30 mass % to 90 mass %, particularly preferably 50 mass % to 90 mass %.

Compound Having Three or More Active Hydrogen Groups

The ink according to the present disclosure preferably further contains at least one compound having three or more active hydrogen groups.

When the ink according to the present disclosure contains a compound having three or more active hydrogen groups, in the ink film, isocyanate groups provided by unblocking of blocked isocyanate groups of the specified polymer react with the compound having three or more active hydrogen groups, which results in more effective thickening of the ink film. This results in further improvements in the scratch resistance of the image and the definition of the image.

When the ink contains a compound having three or more active hydrogen groups, the compound having three or more active hydrogen groups is preferably contained outside of the specified particles (in other words, the specified particles do not include the compound having three or more active hydrogen groups).

The compound having three or more active hydrogen groups may have a single active hydrogen group species alone or two or more active hydrogen group species.

When the compound having three or more active hydrogen groups have two or more active hydrogen group species, it has three or more active hydrogen groups in total.

Examples of the compound having three or more active hydrogen groups include:

compounds having three or more hydroxy groups (such as glycerol, hexanetriol, dipentaerythritol, triethanolamine, and pentaerythritol); and compounds having three or more groups, in total, that include a primary amino group and a secondary amino group (such as triethylenetetramine, tetraethylenepentamine, polyethyleneimine, and pentamethyldiethylenetriamine).

The compound having three or more active hydrogen groups is particularly preferably a compound having three or more hydroxy groups.

From the viewpoint of further improvements in the scratch resistance of images and definition of images, the content of the compound having three or more active hydrogen groups relative to the total solid-content amount of the specified particles is preferably 0.5 mass % to 50 mass %, more preferably 1.0 mass % to 40 mass %, particularly preferably 2.0 mass % to 30 mass %.

Coloring Material

The ink according to the present disclosure may be an ink containing at least one coloring material (what is called "color ink"), or may be an ink not containing any coloring material (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes. Of these, more preferably, pigments are included because of high weather resistance and high color reproducibility.

The pigments are not particularly limited, and may be appropriately selected in accordance with the purpose. Examples of the pigments include publicly known organic pigments and inorganic pigments. Other examples of the pigments include resin particles dyed with dyes, commercially available pigment dispersions, and surface-treated pigments (such as a pigment dispersed in a dispersion medium such as water, a liquid compound, or an insoluble resin, and a pigment surface-treated with, for example, a resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used.

When a pigment is used as the coloring material, the pigment may be a self-dispersible pigment in which the surfaces of pigment particles have a hydrophilic group.

For the coloring materials and the pigment dispersing agent, reference can be appropriately made to Paragraphs 0180 to 0200 of JP2014-040529A and Paragraphs 0122 to 0129 of WO2016/052053A.

When the ink according to the present disclosure contains a coloring material, the coloring material content relative to the total amount of the ink is preferably 0.1 mass % to 20 mass %, more preferably 0.5 mass % to 10 mass %, particularly preferably 0.5 mass % to 5 mass %.

Other Components

The ink according to the present disclosure may contain, as needed, other components different from the above-described components.

Such other components may be included in the specified particles, or may not be included in the specified particles.

Organic Solvent

The ink according to the present disclosure may contain an organic solvent.

When the ink according to the present disclosure contains an organic solvent, higher adhesion between the image and the substrate can be provided.

When the ink according to the present disclosure contains an organic solvent, the organic solvent content relative to the total amount of the ink is preferably 0.1 mass % to 10 mass %, more preferably 0.1 mass % to 5 mass %.

Specific examples of the organic solvent are as follows:

alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, N-methyldiethanolamine, N-ethyldiethanolamine, morpholine, N-ethylmorpholine, ethylenediamine, diethylenediamine, and tetramethylpropylenediamine), amides (such as formamide, N,N-dimethylformamide, and N,N-dimethylacetamide), heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The ink according to the present disclosure may contain at least one surfactant.

When the ink according to the present disclosure contains a surfactant, the ink exhibits higher wettability to the substrate.

Examples of the surfactant include higher fatty acid salt, alkyl sulfate, alkyl ester sulfate, alkyl sulfonate, alkylbenzene sulfonate, sulfosuccinate, naphthalenesulfonate, alkyl phosphate, polyoxyalkylene alkyl ether phosphate, polyoxyalkylene alkyl phenyl ether, polyoxyethylene polyoxypropylene glycol, glycerol ester, sorbitan ester, polyoxyethylene fatty acid amide, and amine oxide.

Of these, the surfactant is preferably at least one surfactant selected from the group consisting of alkyl sulfate, alkyl sulfonate, and alkylbenzene sulfonate, particularly preferably alkyl sulfate.

The surfactant is, from the viewpoint of dispersibility of the specified particles, preferably an alkyl sulfate having an alkyl chain length of 8 to 18, more preferably at least one selected from the group consisting of sodium dodecyl sulfate (SDS, alkyl chain length: 12) and sodium cetyl sulfate (SCS, alkyl chain length: 16).

In addition to the above-described surfactants, there are other surfactants including those described in JP1987-173463A (JP-S62-173463A) and JP1987-183457A (JP-S62-183457A). Examples of the other surfactants include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds.

The fluoroorganic compounds are preferably hydrophobic. The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

Incidentally, the ink according to the present disclosure may contain substantially no surfactants (for example, anionic surfactants).

Herein, "contain substantially no" means that the content relative to the total amount of the ink is less than 1 mass % (preferably less than 0.1 mass %).

The embodiment in which the ink contains substantially no anionic surfactants has an advantage of suppressing foaming of the ink, an advantage of providing an image having higher water resistance, and an advantage of suppressing post-formation blushing of an image due to bleed out, for example. In particular, in the case of using, for preparation of the ink, a pigment dispersion having an anionic dispersible group, there is also the following advantage: degradation of dispersibility of the pigment is suppressed, the degradation being caused because an anionic surfactant causes an increase in the ion concentration of the system to cause a decrease in the degree of electrolytic dissociation of the anionic pigment dispersing agent.

Polymerization Inhibitor

The ink according to the present disclosure may contain a polymerization inhibitor.

When the ink according to the present disclosure contains a polymerization inhibitor, the ink can have higher preservation stability.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine) aluminum salt.

Of these, preferred is at least one selected from the group consisting of p-methoxyphenol, catechols, quinones, alkylphenols, TEMPO, TEMPOL, cupferron Al, and tris(N-nitroso-N-phenylhydroxylamine) aluminum salt; more preferred is at least one selected from the group consisting of p-methoxyphenol, hydroquinone, benzoquinone, BHT, TEMPO, TEMPOL, cupferron Al, and tris(N-nitroso-N-phenylhydroxylamine) aluminum salt.

Ultraviolet Absorbent

The ink according to the present disclosure may contain an ultraviolet absorbent.

When the ink according to the present disclosure contains an ultraviolet absorbent, it can provide an image having higher weather resistance, for example.

Examples of the ultraviolet absorbent include publicly known ultraviolet absorbents such as benzotriazole-based compounds, benzophenone-based compounds, triazine-based compounds, and benzoxazole-based compounds.

The ink according to the present disclosure may optionally contain, from the viewpoint of hardness of the image, adhesion between the image and the substrate, and control of ink ejection stability, outside of the specified particles, a polymerizable monomer, a photopolymerization initiator, and a resin, for example.

These components preferably have water-solubility or water-dispersibility.

Herein, the "water-solubility" is a property in which such a component having been dried at 105° C. for 2 hours has a solubility of more than 1 g in 100 g of distilled water at 25° C.

The "water-dispersibility" is a property in which such a component is water-insoluble and is dispersed in water. This term "water-insoluble" is a property in which such a component having been dried at 105° C. for 2 hours has a solubility of 1 g or less in 100 g of distilled water at 25° C.

The phrase "ink contains a polymerizable monomer outside of the specified particles" means that the ink contains a polymerizable monomer not included in the specified particles. The same applies to a photopolymerization initiator, a water-soluble resin, a water-dispersible resin, or the like contained outside of the specified particles.

Examples of the polymerizable monomer that can be contained outside of the specified particles include polymerizable monomers described in Paragraphs 0148 to 0156 of WO2016/052053A.

Examples of the polymerizable monomer that can be contained outside of the specified particles include radical-polymerizable monomers such as a compound having an ethylenically unsaturated group, acrylonitrile, styrene, unsaturated polyester, unsaturated polyether, unsaturated polyamide, and unsaturated urethane.

Of these, the polymerizable monomer that can be contained outside of the specified particles is preferably a compound having an ethylenically unsaturated group, particularly preferably a compound having a (meth)acryloyl group.

From the viewpoint of water-solubility or water-dispersibility, the polymerizable monomer that can be contained outside of the specified particles is preferably a compound having at least one selected from the group consisting of an amide structure, a polyethylene glycol structure, a polypropylene glycol structure, a carboxyl group, and a salt of a carboxy group.

From the viewpoint of water-solubility or water-dispersibility, the polymerizable monomer that can be contained outside of the specified particles is, for example, preferably at least one selected from the group consisting of (meth)acrylic acid, sodium (meth)acrylate, potassium (meth)acrylate, N,N-dimethylacrylamide, N,N-diethylacrylamide, morpholineacrylamide, N-2-hydroxyethyl(meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer); more preferably, at least one selected from the group consisting of (meth)acrylic acid, N,N-dimethylacrylamide, N-2-hydroxyethyl(meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer).

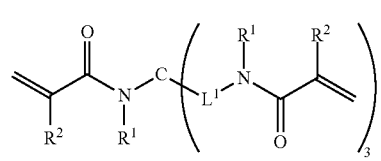

General formula (a)

General formula (b)

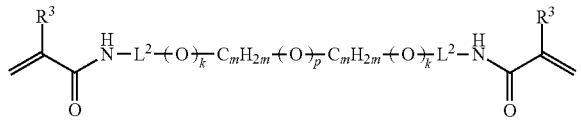

General formula (c)

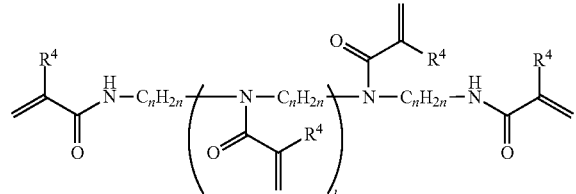

General formula (d)

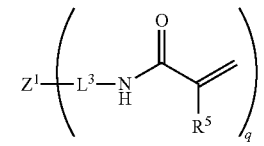

In General formula (a), the plurality of $R^1$'s each independently represent a hydrogen atom, an alkyl group, an aryl group, or a heterocyclic group; the plurality of $R^2$'s each independently represent a hydrogen atom or a methyl group; and the plurality of $L^1$'s each independently represent a single bond or a divalent linking group.

In General formula (b), the plurality of $R^3$'s each independently represent a hydrogen atom or a methyl group; the plurality of $L^2$'s each independently represent an alkylene group having 1 to 8 carbon atoms; the plurality of k's and p each independently represent 0 or 1; the plurality of m's each independently represent an integer of 0 to 8; however, at least one of k's or p is 1.

In General formula (c), the plurality of $R^4$'s each independently represent a hydrogen atom or a methyl group; the plurality of n's each independently represent an integer of 1 to 8; and l represents an integer of 0 or 1.

In General formula (d), $Z^1$ represents a residue of polyol in which q hydrogen atoms have been removed from the hydroxyl groups; q represents an integer of 3 to 6; the plurality of $R^5$'s each independently represent a hydrogen atom or a methyl group; and the plurality of $L^3$'s each independently represent an alkylene group having 1 to 8 carbon atoms.

Specific examples of compounds represented by General formula (a) to General formula (d) include compounds represented by the following AM-1 to AM-4.

AM-1

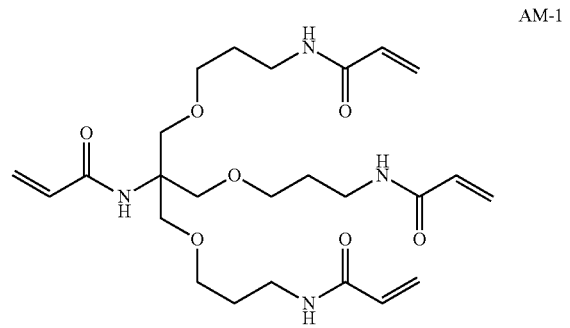

AM-2

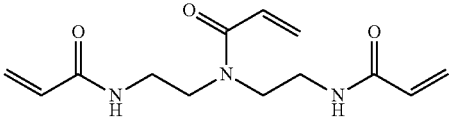

AM-3

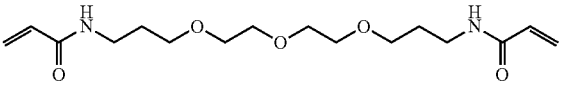

AM-4

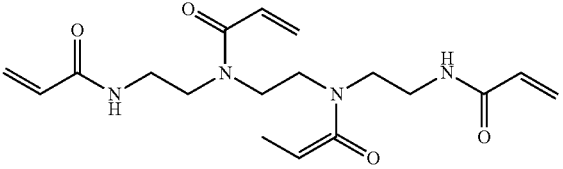

AM-1 to AM-4 above can be synthesized by the method described in JP5591858B.

Regarding the photopolymerization initiator and the resin that can be contained outside of the specified particles, reference can be appropriately made to Paragraphs 0139 to 0147 and 0157 in WO2016/052053A.

Preferred Properties of Ink

When the ink according to the present disclosure is set at 25° C. to 50° C., the ink preferably has a viscosity of 3 mPa·s to 15 mPa·s, more preferably 3 mPa·s to 13 mPa·s. In particular, when the ink according to the present disclosure is set at 25° C., the ink preferably has a viscosity of 50 mPa·s or less. When the viscosity of the ink satisfies such a range, higher ejection stability can be achieved.

Incidentally, the viscosity of the ink is a value measured with a viscometer (VISCOMETER TV-22, Toki Sangyo Co., Ltd.).

The ink according to the present disclosure is applicable to image formation using a coating method, an immersion method, a gravure method, a flexographic method, or an ink jet method.

The ink according to the present disclosure is particularly preferably used for image formation using an ink jet method (in other words, used as an ink jet ink).

Specific examples of the form of the ink according to the present disclosure include the following Forms 1 to 4.

Form 1

Form 1 is a photocurable ink (in other words, an ink including a photopolymerizable monomer) in which the specified polymer is a specified chain polymer.

In Form 1, the specified chain polymer preferably has a Mw of 5000 or more. Regarding a more preferred range of Mw of the specified chain polymer, reference can be made to the above-described preferred range of the molecular weight of the specified polymer.

In Form 1, the photopolymerizable monomer preferably has a molecular weight of 100 to 4000. Regarding a more preferred range of the molecular weight of the photopolymerizable monomer, reference can be made to the above-described more preferred range of the molecular weight of the polymerizable monomer.

Form 2

Form 2 is a photocurable ink (in other words, an ink including a photopolymerizable monomer) in which the specified polymer is a specified crosslinked polymer.

In Form 2, the specified particles are preferably microcapsules including a shell formed of a specified crosslinked polymer having a three-dimensional crosslinked structure, and a core including a photopolymerizable monomer.

In Form 2, the photopolymerizable monomer preferably has a molecular weight of 100 to 4000. Regarding a more preferred range of the molecular weight of the photopolymerizable monomer, reference can be made to the above-described more preferred range of the molecular weight of the polymerizable monomer.

Form 3

Form 3 is a thermosetting ink (in other words, an ink including a thermal-polymerizable monomer) in which the specified polymer is a specified chain polymer.

In Form 3, the specified chain polymer preferably has a Mw of 5000 or more. Regarding a more preferred range of Mw of the specified chain polymer, reference can be made to the above-described preferred range of the molecular weight of the specified polymer.

In Form 3, the thermal-polymerizable monomer preferably has a molecular weight of 100 to 4000. Regarding a more preferred range of the molecular weight of the thermal-polymerizable monomer, reference can be made to the above-described more preferred range of the molecular weight of the polymerizable monomer.

Form 4

Form 4 is a thermosetting ink (in other words, an ink including a thermal-polymerizable monomer) in which the specified polymer is a specified crosslinked polymer.

In Form 4, the specified particles are preferably microcapsules including a shell formed of a specified crosslinked polymer having a three-dimensional crosslinked structure, and a core including a thermal-polymerizable monomer.

In Form 4, the thermal-polymerizable monomer preferably has a molecular weight of 100 to 4000. Regarding a more preferred range of the molecular weight of the thermal-polymerizable monomer, reference can be made to the above-described more preferred range of the molecular weight of the polymerizable monomer.

Example of Method for Producing Ink (Production Method A)

The method for producing the ink according to the present disclosure is not particularly limited, but may be the following example (Production method A).

The Production method A has a step of mixing an oil-phase component including an organic solvent, a specified polymer, and a polymerizable monomer, and an aqueous-phase component including water, and performing emulsification, to form specified particles.

In the Production method A, in the case of using, as the specified polymer, a specified chain polymer, an ink containing specified particles including the specified chain polymer is produced.

In the Production method A, in the case of using, as the specified polymer, a specified crosslinked polymer, an ink containing specified particles including the specified crosslinked polymer is produced.

In the step of forming the specified particles, the above-described oil-phase component and aqueous-phase component are mixed and the resultant mixture is emulsified to thereby form the specified particles. The formed specified particles function as a dispersoid in the ink produced.

The water in the aqueous-phase component functions as a dispersion medium in the ink produced.

Examples of the organic solvent included in the oil-phase component include ethyl acetate and methyl ethyl ketone.

The organic solvent is preferably at least partially removed during formation of the specified particles or after formation of the specified particles.

The oil-phase component may include, in addition to the above-described components, for example, a photopolymerization initiator, a sensitizer, a polymerizable-group-introducing compound (preferably, a compound having a polymerizable group and an active hydrogen group), a polymerizable-group-introduced isocyanate compound, and a hydrophilic-group-introduced isocyanate compound.

The aqueous-phase component is not particularly limited as long as it includes water, and may be water alone.

The aqueous-phase component may include, in addition to water, another component.

For example, the aqueous-phase component may include a hydrophilic-group-introducing compound (preferably a compound having a hydrophilic group and an active hydrogen group).

The aqueous-phase component may contain, as a neutralizer for an unneutralized anionic group (such as a carboxy group, a sulfo group, a phosphoric acid group, a phosphonic acid group, or a sulfuric acid group), a basic compound. This enables, during formation of the specified particles, formation of a neutralized anionic group (specifically, an anionic group in the form of salt such as a salt of a carboxy group, a salt of a sulfo group, a salt of a phosphoric acid group, a salt of a phosphonic acid group, or a salt of a sulfuric acid group).

When the basic compound (neutralizer) is used, the basic compound (neutralizer) is preferably contained at least in the aqueous-phase component.

Examples of the basic compound include inorganic bases such as sodium hydroxide and potassium hydroxide, and organic bases such as triethylamine. Of these, preferred basic compounds are inorganic bases such as sodium hydroxide and potassium hydroxide.

Examples of the salt of the anionic group in the form of salt include alkali metal salts such as sodium salts and potassium salts; and organic amine salts such as triethylamine salts. Of these, preferred salts of the anionic group in the form of salt are alkali metal salts such as sodium salts and potassium salts.

In the Production method A, the total amount of the oil-phase component and the aqueous-phase component except for the organic solvent and water corresponds to the total solid-content amount of the specified particles in the ink produced.

Regarding preferred ranges of the amounts of components that can be used for the Production method A, reference can be made to the above-described section "Ink". This reference is made such that, in the above-described section "Ink", "content" and "the total solid-content amount of the specified particles" are respectively replaced by "usage amount" and "total amount of the oil-phase component and the aqueous-phase component except for the organic solvent and water".

In the step of forming the specified particles, the method of mixing the oil-phase component and the aqueous-phase component is not particularly limited, but is, for example, mixing by stirring.

In the step of forming the specified particles, the method of performing emulsification is not particularly limited, but is, for example, emulsification using an emulsification device such as a homogenizer (for example, a dispersing device).

In the emulsification, the number of revolutions in the dispersing device is, for example, 5000 rpm to 20000 rpm, preferably 10000 rpm to 15000 rpm.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of forming the specified particles, emulsification may be performed under heating.

The emulsification under heating enables more efficient formation of the specified particles.

In addition, the emulsification under heating facilitates, from the mixture, removal of at least a portion of the organic solvent in the oil-phase component.

The heating temperature in the case of emulsification under heating is preferably 35° C. to 70° C., more preferably 40° C. to 60° C.

The step of forming the specified particles may include an emulsification stage of emulsifying the mixture (at a temperature of less than 35° C., for example), and a heating stage of heating (at a temperature of 35° C. or more, for example) the emulsion obtained by the emulsification stage.

Such an embodiment including the emulsification stage and the heating stage enables, particularly in the heating stage, more efficient formation of the specified particles.

In addition, the embodiment including the emulsification stage and the heating stage facilitates, particularly in the heating stage, removal, from the mixture, at least a portion of the organic solvent in the oil-phase component.

The heating temperature in the heating stage is preferably 35° C. to 70° C., more preferably 40° C. to 60° C.

In the heating stage, the heating time is preferably 6 hours to 50 hours, more preferably 12 hours to 40 hours, still more preferably 15 hours to 35 hours.

The Production method A may have, in addition to the step of forming the specified particles, another step as needed.

The other step may be a step of adding other components (such as a pigment) after the step of forming the specified particles.

The other components (such as a pigment) added are the same as the above-described other components that can be contained in the ink.

Another Example of Method for Producing Ink (Production Method B)

The method for producing an ink containing specified particles including a specified crosslinked polymer is also preferably the following Production method B.

The Production method B has a step of mixing an oil-phase component including an organic solvent, a tri- or higher functional isocyanate compound, and a polymerizable monomer, and an aqueous-phase component including water, and performing emulsification in the presence of a blocking agent, to form specified particles.

A preferred example of the Production method B is the same as the preferred example of the Production method A except that the specified polymer in the oil-phase component is replaced by the tri- or higher functional isocyanate compound, and the mixture of the oil-phase component and the aqueous-phase component is emulsified in the presence of a blocking agent.

In a more preferred example of the Production method B, the aqueous-phase component employed is an aqueous-phase component including water and a blocking agent, and the mixture of the oil-phase component and the aqueous-phase component is emulsified in the presence of the blocking agent included in the aqueous-phase component.

Image-Forming Method

The image-forming method according to the present disclosure has a step of applying, onto a substrate, the above-described ink according to the present disclosure to form an ink film (hereafter, also referred to as "application step"), and a step of heating the ink film (hereafter, also referred to as "heating step").

The image-forming method according to the present disclosure may optionally have another step.

The image-forming method according to the present disclosure forms an image having high scratch resistance on the substrate.

Application Step

The application step is a step of applying the ink according to the present disclosure onto a substrate to form an ink film.

The mode of applying the ink onto the substrate may be any one of modes using publicly known processes such as a coating process, an immersion process, or an ink jet process. In particular, the ink jet process is preferred because it enables formation of films (such as images) on various substrates (including recording media).

The substrate is not particularly limited and may be appropriately selected from, for example, publicly known substrates provided as support bodies and recording media.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the substrate include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers. The textile substrates may be textile substrates described in Paragraphs 0039 to 0042 of WO2015/158592A.

Preferred examples of the substrate include plastic substrates such as polyvinyl chloride (PVC) substrates, polystyrene (PS) substrates, polycarbonate (PC) substrates, polyethylene terephthalate (PET) substrates, polypropylene (PP) substrates, and acrylic resin substrates.

From the viewpoint of further improvements in the scratch resistance of images and definition of images, the substrate is preferably a substrate having an active hydrogen group. In this case, an isocyanate group provided by unblocking of the blocked isocyanate group also reacts with the active hydrogen group of the substrate, which enables further improvements in the scratch resistance of the image and the definition of the image.

The substrate having an active hydrogen group is preferably a substrate having, as the active hydrogen group, a hydroxy group.

Examples of the substrate having an active hydrogen group include paper, cellulose films, cotton cloth, and hemp cloth.

The application of the ink by an ink jet process can be performed with a publicly known ink jet recording apparatus.

The ink jet recording apparatus is not particularly limited, and a publicly known ink jet recording apparatus that provides a target resolution can be freely selected and used.

Such an ink jet recording apparatus is, for example, an apparatus including an ink supply device, a temperature sensor, and heating means.

The ink supply device includes, for example, a source tank including the ink according to the present disclosure, supply pipes, an ink supply tank disposed immediately upstream of an ink jet head, a filter, and a piezo ink jet head. The piezo ink jet head may be operated so as to eject multisize dots of preferably 1 pl to 100 pl, more preferably 8 pl to 30 pl, at a resolution of preferably 320 dpi (dot per inch)×320 dpi to 4000 dpi×4000 dpi, more preferably 400 dpi×400 dpi to 1600 dpi×1600 dpi, still more preferably 720 dpi×720 dpi. Incidentally, "dpi" represents the number of dots for 2.54 cm (1 inch).

Alternatively, in the application step, the ink may be applied to a preheated substrate.

In the application step, when the ink is applied to a preheated substrate, the heated substrate can perform the following heating step (specifically, the heated substrate can heat the ink film).

Before the ink is applied, the substrate can be heated by, for example, heating means described as examples in the following heating step.

Heating Step

The heating step is a step of heating the ink film formed on the substrate.

In the heating step, the ink film is heated, so that, as described above, the ink film is thickened, which provides an image having high scratch resistance.

In the image-forming method according to the present disclosure, in the case of using, as the ink according to the present disclosure, the above-described thermosetting ink, the heating step may be performed to heat-cure the ink film (namely, thermal polymerization using the thermal-polymerizable monomer). Stated another way, in the case of using, as the ink according to the present disclosure, the above-described thermosetting ink, the heating step may also serve as a curing step B described later.

The heating in the heating step may be performed by heating, with heating means, the ink applied onto the substrate.

Alternatively, as described above, when, in the application step, the ink is applied to a preheated substrate, the heating in the heating step may be performed by heating the ink with the heated substrate.

The heating means is not particularly limited, and examples include a heating drum, hot air, an infrared lamp, an infrared LED, an infrared heater, a heating oven, a heating plate, an infrared laser, and an infrared dryer. Of these, from the viewpoint that the ink can be efficiently heat-cured, preferred are a light-emitting diode (LED) having a maximum absorption wavelength in the wavelengths of 0.8 µm to 1.5 µm or 2.0 µm to 3.5 µm and having emission wavelengths from near-infrared radiation to far-infrared radiation; a heater that radiates near-infrared radiation to far-infrared radiation; a laser having lasing wavelengths from near-infrared radiation to far-infrared radiation; and a dryer that radiates near-infrared radiation to far-infrared radiation.

The heating temperature during the heating is, from the viewpoint of more effectively thickening the ink film, preferably 40° C. or more, more preferably 40° C. to 200° C., still more preferably 45° C. to 100° C., still more preferably 50° C. to 80° C., still more preferably 55° C. to 70° C.

The heating temperature is the temperature of the ink on the substrate, and can be measured with a thermograph using an infrared thermography apparatus H2640 (manufactured by Nippon Avionics Co., Ltd.).

The heating time can be appropriately set in accordance with, for example, the heating temperature, the composition of the ink, and printing speed. The heating time is preferably 5 seconds or more, more preferably 5 seconds to 5 minutes, more preferably 10 seconds to 1 minute, still more preferably 20 seconds to 1 minute.

Curing Step

The image-forming method according to the present disclosure may have a curing step of curing the ink film having been heated by the heating step.

This curing step causes, in the ink film, a polymerization reaction (namely, crosslinking reaction) of the polymerizable monomer to proceed. Thus, when the image-forming method according to the present disclosure has the curing step, the resultant image has higher hardness, which results in higher scratch resistance of the image.

In the image-forming method according to the present disclosure, in the case of using a photocurable ink, the curing step can be a curing step (hereafter, "curing step A") of irradiating the ink film having been heated by the heating step, with light (namely, an actinic energy ray), to photocure the ink film.

In the image-forming method according to the present disclosure, in the case of using a thermosetting ink, the curing step can be a curing step (hereafter, "curing step B") of subjecting, to heating or irradiation with infrared radiation, the ink film having been heated by the heating step, to thermally cure the ink film.

However, in the case of using the thermosetting ink, instead of performing this curing step B (that is, the curing step B performed in addition to the above-described heating step), the above-described heating step may be performed to achieve thickening and thermal curing of the ink film.

In other words, in the image-forming method according to the present disclosure, in the case of using the thermosetting ink, the heating step of achieving thickening of the ink film and the curing step B of thermally curing the ink film may be individually performed; alternatively, a single heating step of achieving both of thickening and thermal curing of the ink film may be performed.

Curing Step A

The curing step A is a step of irradiating, with an actinic energy ray, the ink film having been heated by the heating step, to cure the ink film.

In the curing step A, the ink film having been heated by the heating step is irradiated with an actinic energy ray, to cause a photocrosslinking reaction (namely, photopolymerization) of the specified particles in the ink film to proceed, to thereby provide higher strength of the ink film.

Examples of the actinic energy ray usable in the curing step A include ultraviolet radiation (UV light), visible light, and an electron beam. Of these, preferred is UV light.

The actinic energy ray (light) preferably has a peak wavelength of 200 nm to 405 nm, more preferably 220 nm to 390 nm, still more preferably 220 nm to 385 nm.

The peak wavelength is also preferably 200 nm to 310 nm, also preferably 200 nm to 280 nm.

During the irradiation with an actinic energy ray (light), the illuminance at the exposed surface is, for example, 10 mW/cm$^2$ to 2000 mW/cm$^2$, preferably 20 mW/cm$^2$ to 1000 mW/cm$^2$.

During the irradiation with an actinic energy ray (light), the exposure energy is, for example, 10 mJ/cm$^2$ to 2000 mJ/cm$^2$, preferably 20 mJ/cm$^2$ to 1000 mJ/cm$^2$.

As sources for emitting an actinic energy ray (light), there are widely known sources such as a mercury lamp, a metal halide lamp, a UV fluorescent lamp, a gas laser, and a solid-state laser.

These light sources listed as examples may be replaced by semiconductor ultraviolet emission devices, which is industrially and environmentally advantageous.

Among semiconductor ultraviolet emission devices, LEDs (Light Emitting Diodes) and LDs (Laser Diodes), which are small, have long longevity and high efficiency, and are inexpensive, are considered as promising light sources.

Preferred light sources are a metal halide lamp, an ultrahigh pressure mercury lamp, a high pressure mercury lamp, a medium pressure mercury lamp, and a low pressure mercury lamp, an LED, and a blue-violet laser.

Of these, in the case of using a sensitizer and a photopolymerization initiator in combination, more preferred is an ultrahigh pressure mercury lamp that emits light at a wavelength of 365 nm, 405 nm, or 436 nm, a high pressure mercury lamp that emits light at a wavelength of 365 nm, 405 nm, or 436 nm, or an LED that emits light at a wavelength of 355 nm, 365 nm, 385 nm, 395 nm, or 405 nm; most preferred is an LED that emits light at a wavelength of 355 nm, 365 nm, 385 nm, 395 nm, or 405 nm.

In the curing step A, the time for irradiating the ink applied onto the substrate with an actinic energy ray is, for example, 0.01 seconds to 120 seconds, preferably 0.1 seconds to 90 seconds.

As the irradiation conditions and the basic irradiation method, the irradiation conditions and the irradiation method disclosed in JP1985-132767A (JP-S60-132767A) can be similarly used.

A preferred mode of irradiation with an actinic energy ray is specifically a mode in which both sides of a head unit including an ink ejection device are equipped with light sources, and the head unit and the light sources are used to perform scanning by, what is called, the shuttle mode; or a mode of irradiation with an actinic energy ray using another light source without being driven.

The irradiation with an actinic energy ray is preferably performed after the lapse of a certain time (for example, 0.01 seconds to 120 seconds, preferably 0.01 seconds to 60 seconds) from landing and heat-drying of the ink.

Curing Step B

The curing step B is a step of subjecting, to heating or irradiation with infrared radiation, the ink film having been heated by the heating step, to thereby thermally cure the ink film.

In the curing step B, the ink film having been heated by the heating step is subjected to heating or irradiation with infrared radiation to cause a thermal crosslinking reaction of the specified particles in the ink (namely, thermal polymerization) to proceed. This provides higher strength of the ink film.

Preferred conditions of the curing step B are the same as the preferred conditions of the heating step.

EXAMPLES

Hereinafter, the present invention will be specifically described with reference to Examples. However, the present invention is not limited to the following Examples.

In the following description, "parts" mean parts by mass unless otherwise specified.

"*" in chemical formulas represent bonding positions.

Synthesis of Specified Chain Polymer

Synthesis of Polymer 1

In accordance with the following reaction scheme, the following Polymer 1 was synthesized as the specified chain polymer.

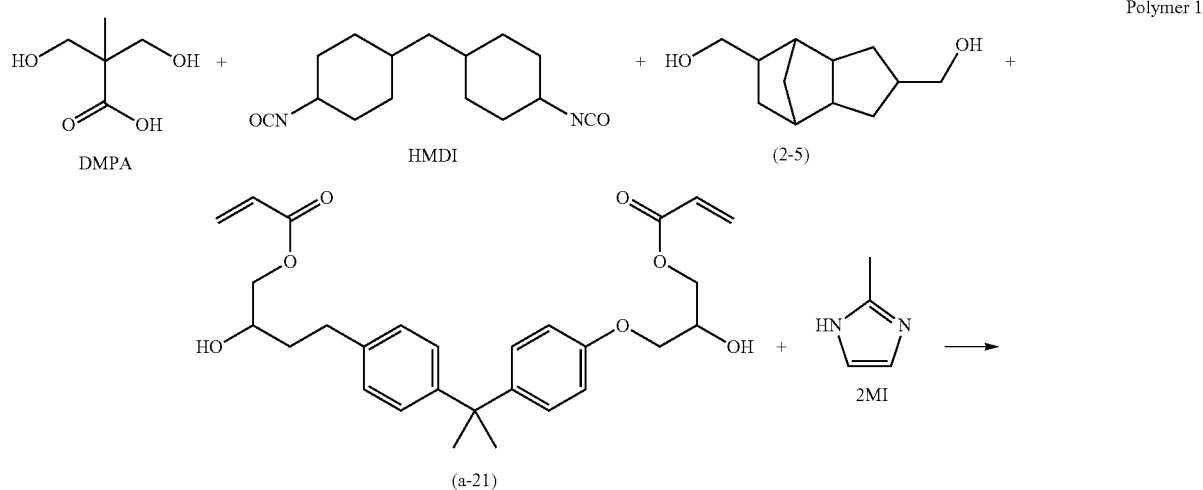

Polymer 1

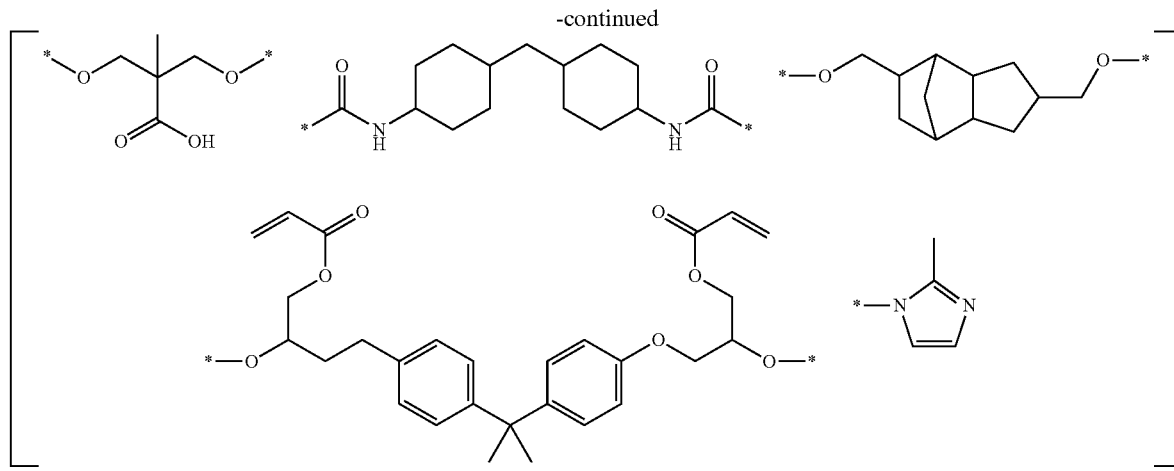

Into a three-neck flask, dicyclohexylmethane-4,4'-diisocyanate (HMDI) (82.5 g), dimethylolpropionic acid (DMPA) (16.9 g), tricyclodecanedimethanol (Compound (2-5)) (2.9 g), bisphenol A epoxy diacrylate (Compound (a-21)) (77.0 g), and ethyl acetate (102.3 g) were charged, and heated at 70° C. To this, 0.2 g of NEOSTANN U-600 (manufactured by Nitto Kasei Co., Ltd., inorganic bismuth catalyst; hereafter, also referred to as "U-600") was added, and stirred at 70° C. for 5 hours.

Subsequently, to this, 2-methylimidazole (2MI) (0.3 g) serving as a blocking agent and ethyl acetate (190 g) were added, and stirred at 70° C. for 3 hours. After the stirring for 3 hours, the reaction solution was left to cool to room temperature, and subsequently subjected to adjustment of the concentration using ethyl acetate to thereby obtain a 30 mass % solution of Polymer 1 (the solvent was ethyl acetate).

Polymer 1 was found to have a weight-average molecular weight (Mw) of 8000, and an acid value of 0.70 mmol/g.

Polymer 1 is a chain urethane polymer having, at the ends of the main chain, blocked isocyanate groups (hereafter, also referred to as "blocked NCO groups") provided using 2-methylimidazole as a blocking agent.

The unblocking temperature of the blocked NCO groups is described in Table 1-1.

Polymer 1 has, as photopolymerizable groups, acryloyl groups.

Synthesis of Polymers 2 to 10 and Comparative Polymer A

The same procedures as in Synthesis of Polymer 1 were performed except that the species of the blocking agent was changed as described in Table 1-1, to synthesize Polymers 2 to 10 and Comparative polymer A, which were all chain polymers.

Polymers 2 to 10 and Comparative polymer A are chain urethane polymers having, at the ends of the main chains, blocked NCO groups.

In Polymers 2 to 10 and Comparative polymer A, the unblocking temperatures of the blocked NCO groups are described in Table 1-1.

Polymers 2 to 10 and Comparative polymer A all have, as photopolymerizable groups, acryloyl groups.

Polymers 2 to 10 and Comparative polymer A were all found to have a weight-average molecular weight (Mw) of 8000, and an acid value of 0.70 mmol/g.

Polymer 11

As a specified chain polymer, Polymer 11 was synthesized, which was a chain (meth)acrylic polymer having, at the ends of side chains, blocked NCO groups. In Polymer 11, the blocked NCO groups are a reaction product of 3,5-dimethylpyrazole serving as a blocking agent and NCO groups.

Detailed descriptions are as follows.

To a three-neck flask, ethyl acetate (PGME) (37.5 g) was charged, and stirred, under a stream of nitrogen at 20 mL/min, at 75° C. for 30 minutes. To this, a mixture of methacrylic acid (MAA) (3.01 g), "Karenz MOI-BP" (registered trademark) (8.79 g) manufactured by SHOWA DENKO K. K., methyl methacrylate (30.00 g), ally methacrylate (8.19 g), and ethyl acetate (37.5 g) was added dropwise at a rate of 1 mL/min. After the dropping completed, heating at 75° C. was performed for 2 hours.

The reaction solution was left to cool to room temperature, and subsequently subjected to adjustment of the concentration using ethyl acetate to thereby obtain a 30 mass % solution of Polymer 11 (the solvent was ethyl acetate).

Polymer 11 was found to have a weight-average molecular weight (Mw) of 14000, and an acid value of 0.70 mmol/g.

The "Karenz MOI-BP" is a methacrylic monomer having a blocked NCO group that is a reaction product of 3,5-dimethylpyrazole serving as a blocking agent and a NCO group (specifically, 2-[(3,5-dimethylpyrazolyl)carbonylamino]ethyl methacrylate).

Synthesis of Polymer 101

In accordance with the following reaction scheme, as a specified chain polymer, the following Polymer 101 was synthesized, which was a chain urethane polymer having, at the ends of the main chain, blocked NCO groups.

Polymer 101

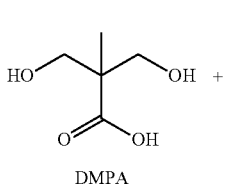

DMPA

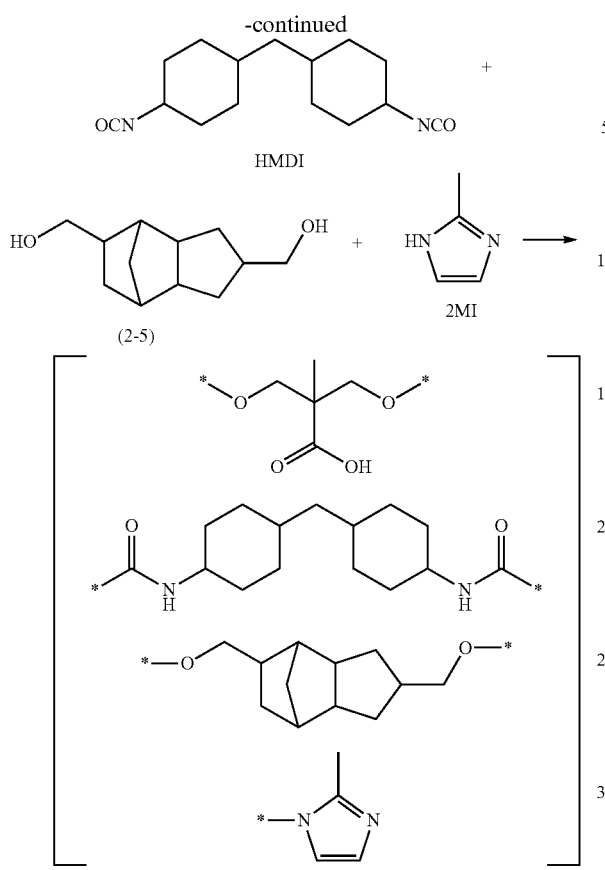

To a three-neck flask, dicyclohexylmethane-4,4'-diisocyanate (HMDI) (41.2 g), dimethylolpropionic acid (DMPA) (6.4 g), tricyclodecanedimethanol (Compound (2-5)) (20.2 g), and ethyl acetate (67.7 g) were charged, and heated at 70° C. To this, 0.14 g of U-600 was added, and stirred at 70° C. for 5 hours.

Subsequently, to this, 2-methylimidazole (2MI) (0.2 g) serving as a blocking agent, and ethyl acetate (42.9 g) were added, and stirred at 70° C. for 3 hours. After stirring for 3 hours, the reaction solution was left to cool to room temperature, and subsequently subjected to adjustment of the concentration using ethyl acetate to thereby obtain a 30 mass % solution of a polymer (the solvent was ethyl acetate).

Polymer 101 was found to have a weight-average molecular weight (Mw) of 8000, and an acid value of 0.70 mmol/g.

Synthesis of Polymers 102 to 104 and Comparative Polymer B

The same procedures as in Synthesis of Polymer 101 were performed except that the species of the blocking agent was changed as described in Table 2-1, to synthesize Polymers 102 to 104, which were specified chain polymers, and Comparative polymer B, which was a comparative chain polymer.

Polymers 102 to 104 and Comparative polymer B are chain urethane polymers having, at the ends of the main chains, blocked NCO groups.

In Polymers 102 to 104 and Comparative polymer B, the unblocking temperatures of the blocked NCO groups are described in Table 2-1.

Polymers 102 to 104 and Comparative polymer B are all found to have a weight-average molecular weight (Mw) of 8000, and an acid value of 0.70 mmol/g.

Polymer 105

As a specified chain polymer, Polymer 105 was synthesized, which was a chain (meth)acrylic polymer having, at the ends of the side chains, blocked NCO groups. In Polymer 105, the blocked NCO groups are a reaction product of 3,5-dimethylpyrazole serving as a blocking agent and NCO groups.

Detailed descriptions are as follows.

To a three-neck flask, ethyl acetate (PGME) (37.5 g) was charged, and stirred, under a stream of nitrogen at 20 mL/min, at 75° C. for 30 minutes. To this, a mixture of methacrylic acid (MAA) (3.01 g), the above-described "Karenz MOI-BP" (8.79 g), methyl methacrylate (38.19 g), and ethyl acetate (37.5 g) was added dropwise at a rate of 1 mL/min. After the dropping completed, heating was performed at 75° C. for 2 hours.

The reaction solution was left to cool to room temperature, and subsequently subjected to adjustment of the concentration using ethyl acetate to thereby obtain a 30 mass % solution of Polymer 105 (the solvent was ethyl acetate).

Polymer 105 was found to have a weight-average molecular weight (Mw) of 20000, and an acid value of 0.70 mmol/g.

Example 1

Photocurable Ink
Preparation of Aqueous Dispersion
Preparation of Oil-Phase Component Ethyl acetate,
the 30 mass % solution of Polymer 1 (the amount of Polymer 1 was 53 parts),
a photopolymerizable monomer SR833S manufactured by Sartomer (44 parts; hereafter, also referred to as "S833"),
a photopolymerization initiator IRGACURE (registered trademark) 819 manufactured by BASF (2.5 parts; hereafter, also referred to as "IRG819"), and
as a sensitizer, 2-isopropylthioxanthone manufactured by Tokyo Chemical Industry Co., Ltd. (0.5 parts; hereafter, also referred to as "ITX"),
were mixed and stirred for 15 minutes, to obtain 44 g of an oil-phase component having a solid content of 36 mass %.

S833 is a bifunctional photopolymerizable monomer having a cyclic structure, specifically tricyclodecanedimethanol diacrylate (molecular weight: 304).

IRG819 is an acylphosphine oxide-based photopolymerization initiator, specifically bis(2,4,6-trimethylbenzoyl)-phenylphosphine oxide.

Preparation of Aqueous-Phase Component

Distilled water (45 g) and sodium hydroxide serving as a neutralizer were mixed and stirred for 15 minutes, to prepare an aqueous-phase component.

The amount of sodium hydroxide used as a neutralizer was adjusted such that the particles to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(Specified chain polymer content relative to total solid-content amount of oil-phase component (mass %)/100)×Acid value of specified chain polymer (mmol/g)×0.9×Molecular weight of sodium hydroxide (g/mol)/1000

The oil-phase component and the aqueous-phase component were mixed. The resultant mixture was emulsified at 25° C. with a homogenizer at 18000 rpm for 10 minutes, to obtain an emulsion. The obtained emulsion was added to distilled water (25 g), and the resultant liquid was stirred at room temperature for 30 minutes. Subsequently, this liquid was heated at 50° C., and stirred at 50° C. for 6 hours, to drive off ethyl acetate from the liquid.

The liquid from which ethyl acetate had been driven off was further stirred at 50° C. for 24 hours, to form specified particles in the liquid.

Subsequently, this liquid including the specified particles was diluted with distilled water such that the solid-content amount became 20 mass %, to obtain an aqueous dispersion of the specified particles.

Preparation of Photocurable Ink

Components were mixed so as to satisfy the following Composition 1 to prepare a photocurable ink.

Composition 1 of Photocurable Ink

The above-described aqueous dispersion: 82 parts

Pigment dispersion liquid (Pro-jet Cyan APD1000 (manufactured by FUJIFILM Imaging Colorants, Inc.), pigment concentration: 14 mass %): 13 parts Fluorosurfactant (manufactured by E. I. du Pont de Nemours and Company, Capstone FS-31, solid content: 25 mass %): 0.3 parts 2-Methylpropanediol: 4.7 parts Evaluations The photocurable ink obtained above was evaluated as described below.

The results are described in Table 1-2.

Scratch Resistance of Cured Film

The photocurable ink stored at room temperature within 1 day from preparation was applied onto a substrate, to form, on the substrate, a coating film having a thickness of 12 μm.

The substrate employed was a polypropylene (PP) substrate CORREX, manufactured by DUROplastic Technologies.

The application was performed using the No. 2 bar of the K Hand Coater, manufactured by RK PRINT COAT INSTRUMENTS LTD.

Subsequently, the coating film was heated to dry at 60° C. for 3 minutes.

The dried coating film was irradiated with ultraviolet radiation (UV) to cure the coating film. Thus, a cured film was obtained.

The irradiation with ultraviolet radiation (UV) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 1.0 W/cm$^2$. This irradiation with UV was performed at an exposure energy of 1000 mJ/cm$^2$.

The cured film formed above was subjected to a scratch test under the following conditions.

Conditions of Scratch Test

Instrument: Reciprocating Abraser "TYPE 30S", manufactured by HEIDON

Scratch stylus: an SUS (stainless steel) scratch stylus having a tip having a radius of curvature of 1.0 mm Load: two conditions of 100 g and 200 g Scratching speed: 3000 mm/min Number of scratching performed: two conditions of 5 strokes and 30 strokes After the scratch test was performed, the surface of the cured film was visually observed, and the scratch resistance of the cured film was evaluated in accordance with the following evaluation grades.

Among the following evaluation grades, AA represents the highest scratch resistance of cured films.

Evaluation Grades of Scratch Resistance of Cured Film

AA: After 30 strokes, no scratch marks were observed in the cured film under each of the load conditions of 100 g and 200 g.

A: After 5 strokes, no scratch marks were observed in the cured film under each of the load conditions of 100 g and 200 g (however, A excludes cases evaluated as AA).

B: After 5 strokes, no scratch marks were observed in the cured film under the load condition of 100 g; however, scratch marks were slightly observed in the cured film under the load condition of 200 g.

C: After 5 strokes, scratch marks were slightly observed in the cured film under the load condition of 100 g.

D: After 5 strokes, scratch marks were clearly observed in the cured film under the load condition of 100 g.

Definition of Image

The substrate was heated with a print heater at 60° C. To the heated substrate, the photocurable ink was ejected through the head of the above-described ink jet printer, to form character images corresponding to FIG. 1 so as to have sizes of 3 points, 5 points, 7 points, and 10 points.

The character images corresponding to FIG. 1 and formed with the sizes were observed with a craft loupe (manufactured by ETSUMI CO., LTD.) at a magnification of 10. The observation result was evaluated, in terms of definition of the image, in accordance with the following evaluation grades. Among the following evaluation grades, AA represents the highest definition of images.

Evaluation Grades of Definition of Image

AA: The character image corresponding to FIG. 1 and having the size of 3 points was formed without illegible lettering or blurring.

A: The character image corresponding to FIG. 1 and having the size of 5 points was formed without illegible lettering or blurring (however, A excludes cases evaluated as AA).

B: The character image corresponding to FIG. 1 and having the size of 7 points was formed without illegible lettering or blurring (however, B excludes cases evaluated as AA or A).

C: The character image corresponding to FIG. 1 and having the size of 10 points was formed without illegible lettering or blurring (however, C excludes cases evaluated as AA, A, or B).

D: The character image corresponding to FIG. 1 and having the size of 10 points was formed illegible or blurry.

Example 2

Photocurable Ink

The same procedures as in Example 1 were performed except that the species and amount of the photopolymerizable monomer were changed as described in Table 1-1.

The results are described in Table 1-2.

S399 is a pentafunctional photopolymerizable monomer not having cyclic structures, specifically dipentaerythritol pentaacrylate (molecular weight: 525).

Examples 3 to 11 and 19

Photocurable Inks

The same procedures as in Example 1 were performed except that Polymer 1 was changed to polymers described in Table 1-1.

The results are described in Table 1-2.

Examples 12 to 17

Photocurable Inks

The same procedures as in Example 1 were performed except that the composition of the photocurable ink was changed to Compositions 2 to 7.

The results are described in Table 1-2.

Compositions 2 to 7 are compositions including, as the compound having three or more active hydrogen groups, glycerol (hereafter, also referred to as "GL") or dipentaerythritol (hereafter, also referred to as "DPE"). Detailed descriptions are as follows.

Composition 2 of Photocurable Ink
- The above-described aqueous dispersion: 82 parts
- Pigment dispersion liquid (Pro-jet Cyan APD1000 (manufactured by FUJIFILM Imaging Colorants, Inc.), pigment concentration: 14 mass %): 13 parts
- Fluorosurfactant (manufactured by E. I. du Pont de Nemours and Company, Capstone FS-31, solid content: 25 mass %): 0.3 parts
- 2-Methylpropanediol: 2.7 parts
- Glycerol (GL) [compound having three or more active hydrogen groups]: 2.0 parts (mass % relative to the total solid-content amount of specified particles is described in Table 1-2)

Compositions 3 to 6 of Photocurable Inks

Compositions 3 to 5 are the same as Composition 2 except that, while the total amount of 2-methylpropanediol and GL was not changed, mass % of GL relative to the total solid-content amount of specified particles was changed as described in Table 1-2.

Composition 6 is the same as Composition 2 except that the total amount of 2-methylpropanediol was replaced by GL (GL: 4.7 parts), and the amount ratio of the aqueous dispersion (82 parts) and GL (4.7 parts) was changed so as to change mass % of GL relative to the total solid-content amount of specified particles as described in Table 1-2.

Composition 7 of Photocurable Ink
- The above-described aqueous dispersion: 82 parts
- Pigment dispersion liquid (Pro-jet Cyan APD1000 (manufactured by FUJIFILM Imaging Colorants, Inc.), pigment concentration: 14 mass %): 13 parts
- Fluorosurfactant (manufactured by E. I. du Pont de Nemours and Company, Capstone FS-31, solid content: 25 mass %): 0.3 parts
- 2-Methylpropanediol: 3.7 parts
- Dipentaerythritol (DPE): 1.0 part (mass % relative to the total solid-content amount of specified particles is described in Table 1-2)

Example 18

Photocurable Ink

The same procedures as in Example 1 were performed except that the substrate used in the evaluations was changed to a cellulose (hereafter, also referred to as "CE") film "PL #500", manufactured by Futamura Chemical Co., Ltd.

The results are described in Table 1-2.

The cellulose film is a substrate having, as active hydrogen groups, hydroxy groups.

Comparative Example 1

Photocurable Ink

The same procedures as in Example 1 were performed except that Polymer 1 was changed to a polymer described in Table 1-1 (namely, Comparative polymer A having blocked NCO groups having an unblocking temperature of more than 150° C.).

The results are described in Table 1-2.

TABLE 1-1

Photocurable ink
Total solid content of particles (amounts are described in parts by mass)

| | Polymer | | | | | Photopolymerizable monomer | |
|---|---|---|---|---|---|---|---|
| | Species | Classification | Unblocking temperature of blocked NCO groups (° C.) | Blocking agent | Amount | Species | Amount |
| Example 1 | Polymer 1 | Urethane polymer | 70 | 2-methylimidazole | 53 | S833 | 44 |
| Example 2 | Polymer 1 | Urethane polymer | 70 | 2-methylimidazole | 53 | S833 | 22 |
| Example 3 | Polymer 2 | Urethane polymer | 70 | 2-ethylimidazole | 53 | S833 | 44 |
| Example 4 | Polymer 3 | Urethane polymer | 70 | 2-mercaptopyridine | 53 | S833 | 44 |
| Example 5 | Polymer 4 | Urethane polymer | 80 | 2-hydroxypyridine | 53 | S833 | 44 |
| Example 6 | Polymer 5 | Urethane polymer | 80 | 2,2,6,6-tetramethylpiperidine | 53 | S833 | 44 |
| Example 7 | Polymer 6 | Urethane polymer | 100 | diethylmalonic acid | 53 | S833 | 44 |
| Example 8 | Polymer 7 | Urethane polymer | 120 | 1,1,3,3-tetramethylguanidine | 53 | S833 | 44 |
| Example 9 | Polymer 8 | Urethane polymer | 120 | t-butylethylamine | 53 | S833 | 44 |
| Example 10 | Polymer 9 | Urethane polymer | 120 | 3,5-dimethylpyrazole | 53 | S833 | 44 |
| Example 11 | Polymer 10 | Urethane polymer | 130 | methyl ethyl ketoxime | 53 | S833 | 44 |
| Example 12 | Polymer 1 | Urethane polymer | 70 | 2-methylimidazole | 53 | S833 | 44 |
| Example 13 | Polymer 1 | Urethane polymer | 70 | 2-methylimidazole | 53 | S833 | 44 |
| Example 14 | Polymer 1 | Urethane polymer | 70 | 2-methylimidazole | 53 | S833 | 44 |
| Example 15 | Polymer 1 | Urethane polymer | 70 | 2-methylimidazole | 53 | S833 | 44 |
| Example 16 | Polymer 1 | Urethane polymer | 70 | 2-methylimidazole | 53 | S833 | 44 |

TABLE 1-1-continued

| | | | | | | | |
|---|---|---|---|---|---|---|---|
| Example 17 | Polymer 1 | Urethane polymer | 70 | 2-methylimidazole | 53 | S833 | 44 |
| Example 18 | Polymer 1 | Urethane polymer | 70 | 2-methylimidazole | 53 | S833 | 44 |
| Example 19 | Polymer 11 | (Meth)acrylic polymer | 120 | 3,5-dimethylpyrazole | 53 | S833 | 44 |
| Comparative Example 1 | Comparative polymer A | Urethane polymer | >150 | 2-propanol (IPA) | 53 | S833 | 44 |

| | Photocurable ink Total solid content of particles (amounts are described in parts by mass) | | | | | |
|---|---|---|---|---|---|---|
| | Photopolymerizable monomer | | Photopolymerization initiator | | Sensitizer | |
| | Species | Amount | Species | Amount | Species | Amount |
| Example 1 | — | — | IRG819 | 2.5 | ITX | 0.5 |
| Example 2 | S399 | 22 | IRG819 | 2.5 | ITX | 0.5 |
| Example 3 | — | — | IRG819 | 2.5 | ITX | 0.5 |
| Example 4 | — | — | IRG819 | 2.5 | ITX | 0.5 |
| Example 5 | — | — | IRG819 | 2.5 | ITX | 0.5 |
| Example 6 | — | — | IRG819 | 2.5 | ITX | 0.5 |
| Example 7 | — | — | IRG819 | 2.5 | ITX | 0.5 |
| Example 8 | — | — | IRG819 | 2.5 | ITX | 0.5 |
| Example 9 | — | — | IRG819 | 2.5 | ITX | 0.5 |
| Example 10 | — | — | IRG819 | 2.5 | ITX | 0.5 |
| Example 11 | — | — | IRG819 | 2.5 | ITX | 0.5 |
| Example 12 | — | — | IRG819 | 2.5 | ITX | 0.5 |
| Example 13 | — | — | IRG819 | 2.5 | ITX | 0.5 |
| Example 14 | — | — | IRG819 | 2.5 | ITX | 0.5 |
| Example 15 | — | — | IRG819 | 2.5 | ITX | 0.5 |
| Example 16 | — | — | IRG819 | 2.5 | ITX | 0.5 |
| Example 17 | — | — | IRG819 | 2.5 | ITX | 0.5 |
| Example 18 | — | — | IRG819 | 2.5 | ITX | 0.5 |
| Example 19 | — | — | IRG819 | 2.5 | ITX | 0.5 |
| Comparative Example 1 | — | — | IRG819 | 2.5 | ITX | 0.5 |

TABLE 1-2

| | Photocurable ink | | | Evaluations | |
|---|---|---|---|---|---|
| | | Compound having three or more active hydrogen groups | | | |
| | Ink composition | Species | Mass % relative to total solid-content amount of particles | Species of substrate | Scratch resistance | Definition of image |
| Example 1 | Composition 1 | None | 0 | PP | A | A |
| Example 2 | Composition 1 | None | 0 | PP | A | A |
| Example 3 | Composition 1 | None | 0 | PP | A | A |
| Example 4 | Composition 1 | None | 0 | PP | A | A |
| Example 5 | Composition 1 | None | 0 | PP | A | A |
| Example 6 | Composition 1 | None | 0 | PP | A | A |
| Example 7 | Composition 1 | None | 0 | PP | B | B |
| Example 8 | Composition 1 | None | 0 | PP | B | B |
| Example 9 | Composition 1 | None | 0 | PP | B | B |
| Example 10 | Composition 1 | None | 0 | PP | B | B |
| Example 11 | Composition 1 | None | 0 | PP | C | C |
| Example 12 | Composition 2 | GL | 12 | PP | AA | AA |
| Example 13 | Composition 3 | GL | 1.8 | PP | A | A |
| Example 14 | Composition 4 | GL | 6.1 | PP | AA | AA |
| Example 15 | Composition 5 | GL | 24 | PP | AA | AA |
| Example 16 | Composition 6 | GL | 32 | PP | A | A |
| Example 17 | Composition 7 | DPE | 6.1 | PP | AA | AA |
| Example 18 | Composition 1 | None | 0 | CE | AA | AA |
| Example 19 | Composition 1 | None | 0 | PP | B | B |
| Comparative Example 1 | Composition 1 | None | 0 | PP | D | D |

As described in Tables 1-1 and 1-2, Examples 1 to 19, which employed photocurable inks containing water and particles including polymers having blocked NCO groups having unblocking temperatures of 150° C. or less (namely, specified particles), provided images having high scratch resistance and high definition, compared with Comparative Example 1, which employed a photocurable ink containing water and particles including a polymer having a blocked NCO group having an unblocking temperature of more than 150° C.

The results of Examples 1 to 11 have demonstrated the following: in the cases where the blocked NCO groups have an unblocking temperature of 120° C. or less (Examples 1 to 10), the images have higher scratch resistance and higher definition.

In addition, the results of Examples 1 to 10 have demonstrated the following: in the cases where the blocking agent is 2-methylimidazole, 2-ethylimidazole, 2-mercaptopyridine, 2-hydroxypyridine, or 2,2,6,6-tetramethylpiperidine (Examples 1 to 6), the images have higher scratch resistance and higher definition.

The results of Examples 1 and 12 have demonstrated the following: in the case where the ink contains a compound having three or more active hydrogen groups (Example 12), the images have higher scratch resistance and higher definition.

The results of Examples 12 to 17 have demonstrated the following: in the cases where the content of the compound having three or more active hydrogen groups relative to the total solid-content amount of specified particles is 2.0 mass % to 30 mass % (Examples 12, 14, 15, and 17), the images have higher scratch resistance and higher definition.

The results of Examples 1 and 18 have demonstrated the following: in the case where the substrate has an active hydrogen group (Example 18), the images have higher scratch resistance and higher definition.

In each of the above-described Examples 1 to 19, the aqueous dispersion of the specified particles was measured for the volume-average dispersed-particle size of the specified particles.

As a result, in each of the Examples, the specified particles were found to have a volume-average dispersed-particle size in the range of 0.15 μm to 0.25 μm.

Example 101

Thermosetting Ink
Preparation of Thermosetting Ink

In the preparation of the ink, the same procedures as in Example 1 were performed except that S833, IRG819, and ITX were changed to Trixene™ BI 7982 (thermal-polymerizable monomer; blocked isocyanate; Baxenden Chemicals Limited) (hereafter, also referred to as "BI7982"; the amount is described in Table 2-1; molecular weight: 793) from which propylene glycol monomethyl ether was driven off under a reduced pressure under conditions of 60° C. and 2.67 kPa (20 torr), and Polymer 1 was changed to Polymer 101 in the same amount as that of Polymer 1. In this way, a thermosetting ink was prepared.
Evaluations The thermosetting ink obtained above was evaluated in the following manner.

The results are described in Table 2-2.
Scratch Resistance of Cured Film

The same procedures as in the evaluation of scratch resistance of a cured film in Example 1 were performed except that, in the evaluation of scratch resistance of a cured film, the procedures of heating the coating film at 60° C. for 3 minutes to dry the coating film, and irradiating the dried coating film with ultraviolet radiation (UV) were changed to a procedure of heating the coating film in an oven at 120° C. for 5 minutes.

Definition of Image

The definition of an image was evaluated as in the definition of an image in Example 1.

Examples 102, 104, 105, and 108

Thermosetting Inks

The same procedures were performed as in Example 101 except that Polymer 101 was changed to polymers described in Table 2-1.

The results are described in Table 2-2.

Example 103

Thermosetting Ink

The same procedures were performed as in Example 101 except that BI7982 was changed to a thermal-polymerizable monomer having an epoxy group that was EPICLON™ 840 (DIC Corporation; hereafter also referred to as "EP840"; the amount is described in Table 2-1; molecular weight: 340) and a thermal curing accelerator that was 2-methylimidazole (hereafter, also referred to as "2MI"; the amount is described in Table 2-1).

The results are described in Table 2-2.

Example 106

Thermosetting Ink

The same procedures were performed as in Example 101 except that the composition of the thermosetting ink was changed to the above-described Composition 2.

The results are described in Table 2-2.

Example 107

Thermosetting Ink

The same procedures were performed as in Example 101 except that the substrate used in the evaluations was changed to the above-described cellulose (CE) film.

The results are described in Table 2-2.

Comparative Example 101

Thermosetting Ink

The same procedures were performed as in Example 101 except that Polymer 1 was changed to a polymer described in Table 2-1 (specifically, Comparative polymer B having blocked NCO groups having an unblocking temperature of more than 150° C.).

The results are described in Table 2-2.

TABLE 2-1

Thermosetting ink
Total solid content of particles (amounts are described in parts by mass)

| | Polymer | | | | | Thermal-polymerizable monomer | | Thermal curing accelerator | |
|---|---|---|---|---|---|---|---|---|---|
| | Species | Classification | Unblocking temperature of blocked NCO groups (° C.) | Blocking agent | Amount | Species | Amount | Species | Amount |
| Example 101 | Polymer 101 | Urethane polymer | 70 | 2-methylimidazole | 53 | BI7982 | 47 | — | — |
| Example 102 | Polymer 102 | Urethane polymer | 80 | 2,2,6,6-tetramethylpiperidine | 53 | BI7982 | 47 | — | — |
| Example 103 | Polymer 102 | Urethane polymer | 80 | 2,2,6,6-tetramethylpiperidine | 53 | EP840 | 43 | 2MI | 4 |
| Example 104 | Polymer 103 | Urethane polymer | 120 | 3,5-dimethylpyrazole | 53 | BI7982 | 47 | — | — |
| Example 105 | Polymer 104 | Urethane polymer | 130 | methyl ethyl ketoxime | 53 | BI7982 | 47 | — | — |
| Example 106 | Polymer 101 | Urethane polymer | 70 | 2-methylimidazole | 53 | BI7982 | 47 | — | — |
| Example 107 | Polymer 101 | Urethane polymer | 70 | 2-methylimidazole | 53 | BI7982 | 47 | — | — |
| Example 108 | Polymer 105 | (Meth)acrylic polymer | 120 | 3,5-dimethylpyrazole | 53 | BI7982 | 47 | — | — |
| Comparative Example 101 | Comparative polymer B | Urethane polymer | >150 | 2-propanol (IPA) | 53 | BI7982 | 47 | — | — |

TABLE 2-2

Thermosetting ink

| | | Compound having three or more active hydrogen groups | | Evaluations | | |
|---|---|---|---|---|---|---|
| | Ink composition | Species | Mass % relative to total solid-content amount of particles | Species of substrate | Scratch resistance | Definition of image |
| Example 101 | Composition 1 | None | 0 | PP | A | A |
| Example 102 | Composition 1 | None | 0 | PP | A | A |
| Example 103 | Composition 1 | None | 0 | PP | A | A |
| Example 104 | Composition 1 | None | 0 | PP | B | B |
| Example 105 | Composition 1 | None | 0 | PP | C | C |
| Example 106 | Composition 2 | GL | 12 | PP | AA | AA |
| Example 107 | Composition 1 | None | 0 | CE | AA | AA |
| Example 108 | Composition 1 | None | 0 | PP | B | B |
| Comparative Example 101 | Composition 1 | None | 0 | PP | D | D |

As described in Tables 2-1 and 2-2, Examples 101 to 108 relating to thermosetting inks also provided results similar to those of Examples 1 to 19 relating to photocurable inks.

In each of the above-described Examples 101 to 108, the aqueous dispersion of the specified particles was measured for the volume-average dispersed-particle size of the specified particles.

As a result, in each of the Examples, the specified particles were found to have a volume-average dispersed-particle size in the range of 0.15 μm to 0.25 μm.

Example 201

Photocurable Ink Including MC
Preparation of Aqueous Dispersion of Microcapsules (MC)

In the following manner, an aqueous dispersion of microcapsules (MC) was prepared, the microcapsules including a shell formed of a urethane polymer being a specified crosslinked polymer having a three-dimensional crosslinked structure, and a core including a photopolymerizable monomer, a photopolymerization initiator, and a sensitizer.

In this Example, the microcapsules (MC) correspond to the specified particles.

Preparation of Oil-Phase Component
Ethyl acetate,
TAKENATE (registered trademark) D-110N (43 parts as the amount of a trifunctional isocyanate compound present as solid content; hereafter, this solid content is also referred to as "D110") manufactured by Mitsui Chemicals, Inc.,
a solution of the following NCO1 (10 parts as the amount of NCO1 present as solid content),
the above-described S833 as a photopolymerizable monomer (42.5 parts),
the above-described IRG819 as a photopolymerization initiator (2.5 parts), and
the above-described ITX as a sensitizer (0.5 parts),
were mixed and stirred for 15 minutes, to obtain 45.7 g of an oil-phase component having a solid content of 30 mass %.

TAKENATE D-110N is a 75 mass % ethyl acetate solution of an adduct of trimethylolpropane (TMP) and m-xylylene diisocyanate (XDI) ("D110", which is a trifunctional isocyanate compound).

NCO1 is an isocyanate compound having an introduced carboxy group, specifically, an adduct of 2,2-bis(hydroxymethyl) butyrate (DMBA) and IPDI (DMPA/IPDI=1/3 (molar ratio)). NCO1 has an acid value of 1.2 mmol/g.

The above-described NCO1 solution is a 35 mass % ethyl acetate solution of NCO1.

The NCO1 solution was prepared in the following manner: to a three-neck flask, 18 g of 2,2-bis(hydroxymethyl) butyrate (DMBA), 82 g of isophorone diisocyanate (IPDI), and 186 g of ethyl acetate (AcOEt) were added, and heated at 50° C.; to this, 0.3 g of NEOSTANN U-600 was added, and a reaction was caused for 3 hours.

Preparation of Aqueous-Phase Component

Distilled water (43.1 g), sodium hydroxide serving as a neutralizer, and 2-methylimidazole serving as a blocking agent were mixed and stirred for 15 minutes, to prepare an aqueous-phase component.

The amount of 2-methylimidazole relative to 43 parts of the D110 was set to 1.5 parts.

The amount of sodium hydroxide used as a neutralizer was adjusted such that the MC to be produced would have a neutralization degree of 90%.

Specifically, the amount of sodium hydroxide was determined using the following mathematical formula.

Amount of sodium hydroxide (g)=Total amount of oil-phase component (g)×(Concentration of solid contents of oil-phase component (mass %)/100)×(NCO1 content relative to total solid-content amount of oil-phase component (mass %)/100)×Acid value of NCO1(mmol/g)×0.9× Molecular weight of sodium hydroxide (g/mol)/ 1000

The oil-phase component and the aqueous-phase component were mixed, and the resultant mixture was emulsified at room temperature with a homogenizer at 12000 rpm (round per minute) for 10 minutes, to obtain an emulsion. The obtained emulsion was added to distilled water (15.3 g). The resultant liquid was heated at 50° C., and stirred at 50° C. for 5 hours, to drive off ethyl acetate from the liquid. The remaining liquid was diluted with distilled water such that the solid-content amount became 20 mass %, to thereby obtain an aqueous dispersion of microcapsules.

The polymer forming the shells of the microcapsules is a urethane polymer that is formed by a reaction between D110, which is a trifunctional isocyanate compound, and NCO1, which is an isocyanate compound having an introduced carboxy group, and that has a three-dimensional crosslinked structure. The ends of the urethane polymer are deactivated with blocked NCO groups that are a reaction product of 2-methylimidazole serving as a blocking agent and isocyanate groups.

The polymer of the shells of the microcapsules has
urethane groups originally included in NCO1,
urethane groups originally included in D110, and
urea groups formed by reactions of isocyanate groups in D110 or NCO1, isocyanate groups in D110 or NCO1, and water.

Preparation of Photocurable Ink

Components were mixed together so as to satisfy the following Composition 1 to prepare a photocurable ink.

Composition 1 of Photocurable Ink
  The above-described aqueous dispersion: 82 parts
  Pigment dispersion liquid (Pro-jet Cyan APD1000 (manufactured by FUJIFILM Imaging Colorants, Inc.), pigment concentration: 14 mass %): 13 parts
  Fluorosurfactant (manufactured by E. I. du Pont de Nemours and Company, Capstone FS-31, solid content: 25 mass %): 0.3 parts
  2-Methylpropanediol: 4.7 parts Evaluations The obtained photocurable ink was evaluated as in the evaluations in Example 1.

The results are described in Table 3.

TABLE 3

Photocurable ink containing MC

Starting materials of MC (amounts are described in parts by mass)

| | Shells of MC (starting materials) | | | | | Cores of MC | | | | | |
|---|---|---|---|---|---|---|---|---|---|---|---|
| | Starting materials of crosslinked polymer skeleton | | Blocking agent | | | Photopolymerizable monomer | | Photopolymerization initiator | | Sensitizer | |
| | Species | Amount | Species | Amount | Species | Amount | Species | Amount | Species | Amount | Species |
| Example 201 | D110 | 43 | NCO1 | 10 | 2-methylimidazole | 1.5 | S833 | 42.5 | IRG819 | 2.5 | ITX |

Photocurable ink containing MC

Starting materials of MC (amounts are described in parts by mass)

| | Cores of MC | | Evaluation results | | |
|---|---|---|---|---|---|
| | Sensitizer Amount | Ink composition | Species of substrate | Scratch resistance | Definition of image |
| Example 201 | 0.5 | Composition 1 | PP | B | B |

As described in Table 3, it has also been demonstrated that Example 201 relating to the photocurable ink containing MC as the specified particles has the advantages of providing images having high scratch resistance and high definition.

Comparison between this Example 201 (Table 3) and the above-described Example 1 (Tables 1-1 and 1-2) has demonstrated the following: Example 1, which includes, as the specified polymer, the chain polymer (Polymer 1) having a structure in which blocked isocyanate groups are disposed at the ends of the main chain, provides images having high scratch resistance and high definition, compared with Example 201, which includes, as the specified polymer, the three-dimensional crosslinked polymer forming the shells of MC.

In the above-described Example 201, the aqueous dispersion of MC was measured for the volume-average dispersed-particle size of MC. As a result, MC were found to have a volume-average dispersed-particle size in the range of 0.15 µm to 0.25 µm.

Example 301

Thermosetting Ink Containing MC
Preparation of Thermosetting Ink

In the following manner, an aqueous dispersion of microcapsules (MC) was prepared, the microcapsules including a shell formed of a urethane polymer being a specified crosslinked polymer having a three-dimensional crosslinked structure, and a core including a thermal-polymerizable monomer.

In this Example, the microcapsules (MC) correspond to the specified particles.

Specifically, the same procedures as in Preparation of photocurable ink in Example 201 were performed except that S833, IRG819, and ITX were changed to BI7982 (in an amount described in Table 4), to prepare a thermosetting ink.

Evaluations

The thermosetting ink obtained above was evaluated as in Example 101 relating to a thermosetting ink.

The results are described in Table 4.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink composition, comprising:
   water; and
   a particle comprising a photopolymerizable monomer and a polymer having a blocked isocyanate group having an unblocking temperature of 80° C. or less,
   wherein a content of the photopolymerizable monomer included in the particle is from 10% by mass to 90% by mass with respect to a total solid-content amount of the particle,
   wherein the polymer having a blocked isocyanate group having an unblocking temperature of 80° C. or less comprises a reaction product of a blocking agent and an isocyanate group, and
   wherein the blocking agent comprises at least one selected from the group consisting of 2-methylimidazole, 2-ethylimidazole, 2-mercaptopyridine, 2-hydroxypyridine, and 2,2,6,6-tetramethylpiperidine.

2. The ink composition according to claim 1, wherein the polymer comprises at least one selected from the group consisting of a urethane polymer, a urea polymer, and a (meth)acrylic polymer.

TABLE 4

| | Thermosetting ink containing MC | | | | | | | | | |
|---|---|---|---|---|---|---|---|---|---|---|
| | Starting materials of MC (amounts are described in parts by mass) | | | | | | | | | |
| | Shells of MC (starting materials) | | | | Cores of MC | | | | | |
| | Starting materials of crosslinked polymer skeleton | | Blocking agent | | Thermal-polymerizable monomer | | Ink | Evaluation results | | |
| | Species | Amount | Species | Amount | Species | Amount | Species | Amount | composition | Species of substrate | Scratch resistance | Definition of image |
| Example 301 | D110 | 43 | NCO1 | 10 | 2-methyl-imidazole | 1.5 | BI7982 | 45.5 | Composition 1 | PP | B | B |

As described in Table 4, Example 301 relating to a thermosetting ink containing MC also provided results similar to those of Example 201 relating to a photocurable ink containing MC.

Comparison between this Example 301 (Table 4) and the above-described Example 101 (Tables 2-1 and 2-2) has demonstrated the following: Example 101, which includes, as the specified polymer, a chain polymer (Polymer 101) having a structure in which blocked isocyanate groups are disposed at the ends of the main chain, provides images having high scratch resistance and high definition, compared with Example 301, which includes, as the specified polymer, a three-dimensional crosslinked polymer forming the shells of MC.

In the above-described Example 301, the aqueous dispersion of MC was measured for volume-average dispersed-particle size of MC. As a result, MC were found to have a volume-average dispersed-particle size in the range of 0.15 µm to 0.25 µm.

The entire contents disclosed by JP2017-164674 filed in the Japan Patent Office on Aug. 29, 2017 are incorporated herein by reference.

3. A method for producing the ink composition according to claim 1, the method comprising:
   mixing and emulsifying an oil-phase component comprising an organic solvent, the polymer, and the photopolymerizable monomer, and an aqueous-phase component comprising water to form the particle.

4. An image-forming method, comprising:
   applying, onto a substrate, the ink composition according to claim 1 to form an ink film; and
   heating the ink film.

5. The ink composition according to claim 1, wherein the polymer comprises a chain polymer, and
   the blocked isocyanate group having an unblocking temperature of 80° C. or less is disposed at an end of a main chain of the chain polymer.

6. The ink composition according to claim 1, further comprising a compound having three or more active hydrogen groups.

7. The ink composition according to claim 6, wherein a content of the compound having three or more active hydrogen groups relative to a total solid-content amount of the particle is 2.0 mass % to 30 mass %.

8. The ink composition according to claim 1, which is used as an ink jet ink.

9. The image-forming method according to claim 4, wherein the substrate has an active hydrogen group.

10. The image-forming method according to claim 4, wherein the image-forming method comprises an inkjet method.

\* \* \* \* \*